US009471435B2

(12) United States Patent
Michihata et al.

(10) Patent No.: US 9,471,435 B2
(45) Date of Patent: Oct. 18, 2016

(54) INFORMATION PROCESSING DEVICE, INFORMATION PROCESSING METHOD, AND COMPUTER PROGRAM

(75) Inventors: Satoshi Michihata, Tokyo (JP); Kiyoyasu Maruyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 142 days.

(21) Appl. No.: 14/370,657

(22) PCT Filed: Jun. 11, 2012

(86) PCT No.: PCT/JP2012/064885
§ 371 (c)(1),
(2), (4) Date: Jul. 3, 2014

(87) PCT Pub. No.: WO2013/103023
PCT Pub. Date: Jul. 11, 2013

(65) Prior Publication Data
US 2014/0365823 A1 Dec. 11, 2014

(30) Foreign Application Priority Data
Jan. 5, 2012 (JP) .................................. 2012-000492

(51) Int. Cl.
*G06F 11/00* (2006.01)
*G06F 11/14* (2006.01)
*G06F 9/44* (2006.01)

(52) U.S. Cl.
CPC ......... *G06F 11/1441* (2013.01); *G06F 9/4401* (2013.01); *G06F 11/1417* (2013.01); *G06F 11/1469* (2013.01)

(58) Field of Classification Search
CPC .................. G06F 11/1417; G06F 11/1441
See application file for complete search history.

(56) References Cited

U.S. PATENT DOCUMENTS 5,835,761 A   11/1998  Ishii et al.
6,018,629 A    1/2000  Tojima
(Continued)

FOREIGN PATENT DOCUMENTS

CN    102053875 A    5/2011
JP     5-173965 A    7/1993
(Continued)

OTHER PUBLICATIONS

International Search Report, issued in PCT/JP2012/064885, dated Aug. 28, 2012.
(Continued)

*Primary Examiner* — Yolanda L Wilson
(74) *Attorney, Agent, or Firm* — Birch, Stewart, Kolasch & Birch, LLP

(57) ABSTRACT

An information processing device includes: a nonvolatile memory having a program area storing a program for booting a system, and backup areas each storing a backup program identical in content to the program; a process executing unit that executes the program to perform a boot process of the system; an error detection unit that performs error detection on the program in parallel with the boot process; and a reboot unit that, when the error detection unit detects an error in the program, performs a recovery process to replace the program with one of the backup programs, and reboots the system using the replaced program. In the recovery process, the reboot unit refers to history information indicating a history of replacement of the program with the backup programs, selects the backup program used for the replacement from among the backup programs, and replaces the program with the selected backup program.

17 Claims, 10 Drawing Sheets

(56) References Cited

U.S. PATENT DOCUMENTS

| | | | |
|---|---|---|---|
| 6,754,855 B1* | 6/2004 | Denninghoff | G06F 9/4406 714/25 |
| 2001/0046157 A1 | 11/2001 | Haraguchi et al. | |
| 2002/0053044 A1* | 5/2002 | Gold | G06F 11/1417 714/6.24 |
| 2003/0005277 A1* | 1/2003 | Harding | G06F 11/1417 713/2 |
| 2003/0182547 A1* | 9/2003 | Kumagai | G06F 9/441 713/2 |
| 2004/0153724 A1* | 8/2004 | Nicholson | G06F 11/0709 714/6.11 |
| 2004/0268116 A1* | 12/2004 | Vasisht | G06F 11/1417 713/100 |
| 2005/0223211 A1 | 10/2005 | Sukegawa et al. | |
| 2006/0085666 A1* | 4/2006 | Stakutis | G06F 11/1417 714/2 |
| 2008/0052506 A1 | 2/2008 | Iima et al. | |
| 2008/0148038 A1* | 6/2008 | Abe | G06F 11/073 713/2 |
| 2010/0205423 A1* | 8/2010 | Shao | G06F 11/1417 713/2 |
| 2011/0093675 A1* | 4/2011 | Lu | G06F 11/1417 711/162 |
| 2012/0246384 A1* | 9/2012 | Lin | G06F 12/0246 711/103 |
| 2013/0031413 A1* | 1/2013 | Righi | G06F 11/1417 714/37 |
| 2014/0089563 A1* | 3/2014 | Wu | G06F 11/1417 711/103 |

FOREIGN PATENT DOCUMENTS

| | | |
|---|---|---|
| JP | 6-78086 A | 3/1994 |
| JP | 7-255080 A | 10/1995 |
| JP | 8-16408 A | 1/1996 |
| JP | 9-146814 A | 6/1997 |
| JP | 10-11293 A | 1/1998 |
| JP | 10-21085 A | 1/1998 |
| JP | 10-91405 A | 4/1998 |
| JP | 2001-331327 A | 11/2001 |
| JP | 2005-275697 A | 10/2005 |
| JP | 2008-84291 A | 4/2008 |
| JP | 2008-117148 A | 5/2008 |
| JP | 2008-217636 A | 9/2008 |
| JP | 2009-151384 A | 7/2009 |
| JP | 2010-26650 A | 7/2009 |
| WO | WO 2008/075646 A1 | 6/2008 |

OTHER PUBLICATIONS

Office Action issued in Japanese Patent Application No. 2013-552383 dated Apr. 8, 2014.

* cited by examiner

FIG.2

| # | Content | Block |
|---|---|---|
| 100 | BOOTING PROGRAM | B1 |
| 101 | CHECKSUM VALUE | |
| 102 | 1ST BOOTING PROGRAM BACKUP | B2 |
| 103 | CHECKSUM VALUE | |
| 104 | 2ND BOOTING PROGRAM BACKUP | B3 |
| 105 | CHECKSUM VALUE | |
| 106 | KERNEL PROGRAM | B4 |
| 107 | CHECKSUM VALUE | |
| 108 | 1ST KERNEL PROGRAM BACKUP | B5 |
| 109 | CHECKSUM VALUE | |
| 110 | 2ND KERNEL PROGRAM BACKUP | B6 |
| 111 | CHECKSUM VALUE | |
| 112 | APPLICATION CONFIGURATION FILE A | B7 |
| 113 | CHECKSUM VALUE | |
| 114 | APPLICATION CONFIGURATION FILE B | |
| 115 | CHECKSUM VALUE | |
| 116 | 1ST APPLICATION CONFIGURATION FILE A BACKUP | B8 |
| 117 | CHECKSUM VALUE | |
| 118 | 1ST APPLICATION CONFIGURATION FILE B BACKUP | |
| 119 | CHECKSUM VALUE | |
| 120 | 2ND APPLICATION CONFIGURATION FILE A BACKUP | B9 |
| 121 | CHECKSUM VALUE | |
| 122 | 2ND APPLICATION CONFIGURATION FILE B BACKUP | |
| 123 | CHECKSUM VALUE | |
| 124 | REPLACEMENT FLAG INFORMATION | |
| 126 | BOOT HISTORY INFORMATION | |
| 128 | REPLACEMENT ORDER INFORMATION | |

FIG.8

| | ADDRESS | REPLACEMENT FLAG |
|---|---|---|
| BOOTING PROGRAM | M | 0 |
| KERNEL PROGRAM | M + 1 | 0 |
| APPLICATION CONFIGURATION FILE A | M + 2 | 0 |
| APPLICATION CONFIGURATION FILE B | M + 3 | 0 |

124

INFORMATION PROCESSING DEVICE, INFORMATION PROCESSING METHOD, AND COMPUTER PROGRAM

TECHNICAL FIELD

The present invention relates to an information processing device, an information processing method, and a computer program.

BACKGROUND ART

Recently, NAND-type flash memories, which are nonvolatile memories, have come into widespread use. Compared with NOR-type flash memories, the NAND-type flash memories have the advantages of higher capacity and lower cost per bit, but the disadvantage of inferior data reliability, because bit errors may occur due to leakage of charge when the stored data are repeatedly read. Therefore, if a program for booting a system is stored in a NAND-type flash memory, because of such bit errors, the system may fail to be booted or may hung up after being booted.

Patent Document 1 describes a control device that reads a first boot program from a system nonvolatile memory and performs error detection on the first boot program. If it determines that the read first boot program has been improperly changed, it reads a second boot program from a backup nonvolatile memory and performs error detection on the second boot program. If it determines that the read second boot program has been improperly changed, it outputs an error notification. When the control device determines, as a result of the error detection on the first or second boot program, that the boot program has not been improperly changed, it performs a boot process using the boot program.

PRIOR ART REFERENCES

Patent References

Patent Document 1: Japanese Patent Application Publication No. 2010-26650

SUMMARY OF THE INVENTION

Problems to be Solved by the Invention

The control device described in Patent Document 1 performs error detection on the boot program read from the system nonvolatile memory, and if it determines as a result of the error detection that the boot program has not been improperly changed, then it starts the boot process using the boot program. Therefore, there is a problem that the start of the boot process is delayed.

An object of the present invention is to provide an information processing device, an information processing method, and a computer program that can start a boot process of a system quickly and perform a reboot with a highly reliable program when an error is detected in a program for booting.

Means for Solving the Problems

An information processing device according to the present invention includes:

a nonvolatile memory having a program area storing a program for booting a system, and a plurality of backup areas each storing a backup program identical in content to the program;

a process executing means for executing the program stored in the program area to perform a boot process of the system;

an error detection means for performing error detection on the program stored in the program area in parallel with the boot process by the process executing means; and a reboot means for, when the error detection means detects an error in the program, performing a recovery process to replace the program stored in the program area with one of the backup programs stored in the backup areas, and rebooting the system using the replaced program stored in the program area; wherein when performing the recovery process, the reboot means refers to history information indicating a history of replacement of the program with the backup programs, selects the backup program used for the replacement from among the backup programs based on the history information, and replaces the program with the selected backup program.

An information processing method according to the present invention includes:

a process executing step for executing a program for booting a system stored in a nonvolatile memory to perform a boot process of the system, the nonvolatile memory having a program area storing the program and a plurality of backup areas each storing a backup program identical in content to the program;

an error detection step for performing error detection on the program stored in the program area in parallel with the boot process in the process executing step; and a reboot step for, when the error detection step detects an error in the program, performing a recovery process to replace the program stored in the program area with one of the backup programs stored in the backup areas, and rebooting the system using the replaced program stored in the program area; wherein when performing the recovery process, the reboot step refers to history information indicating a history of replacement of the program with the backup programs, selects the backup program used for the replacement from among the backup programs based on the history information, and replaces the program with the selected backup program.

A computer program according to the present invention causes a computer to execute:

a process executing step for executing a program for booting a system stored in a nonvolatile memory to perform a boot process of the system, the nonvolatile memory having a program area storing the program and a plurality of backup areas each storing a backup program identical in content to the program;

an error detection step for performing error detection on the program stored in the program area in parallel with the boot process in the process executing step; and a reboot step for, when the error detection step detects an error in the program, performing a recovery process to replace the program stored in the program area with one of the backup programs stored in the backup areas, and rebooting the system using the replaced program stored in the program area; wherein when performing the recovery process, the reboot step refers to history information indicating a history of replacement of the program with the backup programs, selects the backup program used for the replacement from among the backup programs based on the history information, and replaces the program with the selected backup program.

Effect of the Invention

According to the present invention, it is possible to start a boot process of a system quickly and perform a reboot with a highly reliable program when an error is detected in a program for booting.

BRIEF DESCRIPTION OF THE DRAWINGS

FIG. 2 is a schematic diagram showing the storage format of a nonvolatile memory.

FIG. 8 is a schematic diagram showing the format of replacement flag information.

MODES FOR CARRYING OUT THE INVENTION

An embodiment of the invention will now be described with reference to the drawings.

<Configuration of Information Processing Device>

Figure 1:
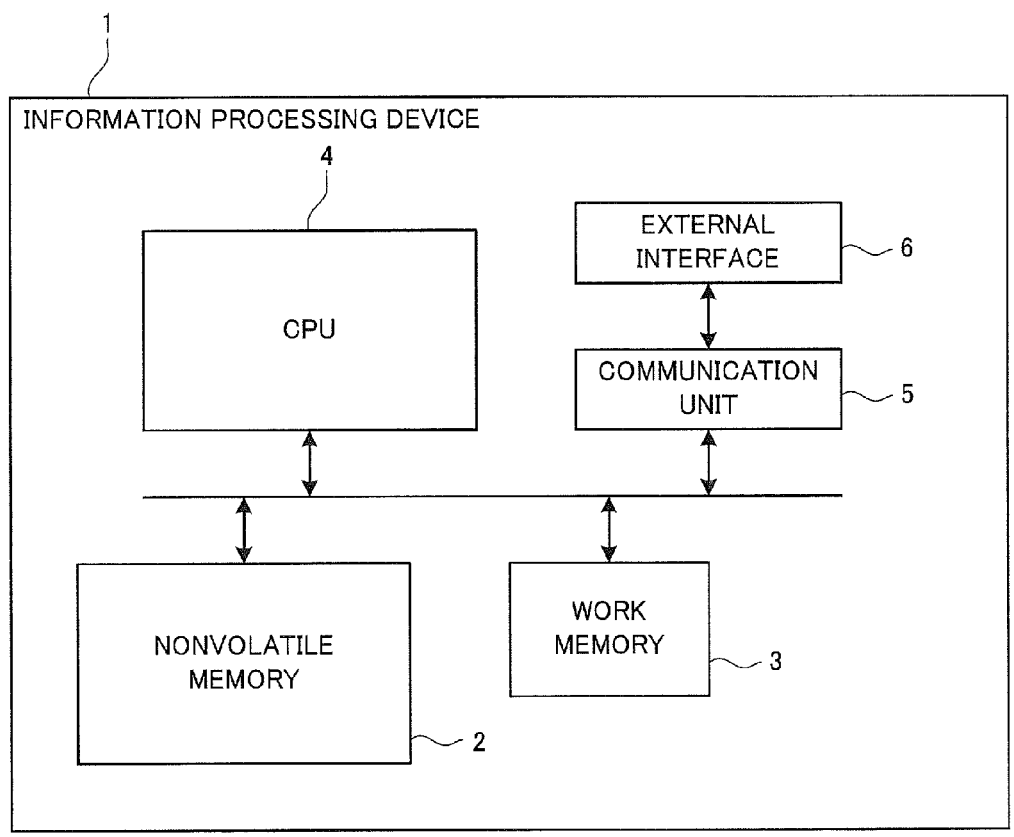
FIG. 1 is a block diagram schematically showing the configuration of an information processing device in an embodiment.

FIG. 1 is a block diagram schematically showing the configuration of an information processing device 1 according to this embodiment. In FIG. 1, the information processing device 1 includes a nonvolatile memory 2, a work memory 3, a central processing unit (CPU) 4, a communication unit 5, and an external interface (external IF) 6.

The nonvolatile memory 2 is a readable and writable memory, such as a NAND-type flash memory, that stores a variety of programs and data. The nonvolatile memory 2 includes a program area storing a program (hereinafter referred to as the 'boot program') for booting a system, and one or more backup areas each storing a backup program (also referred to as the copied program) identical in content to the boot program. The system referred to above is specifically a computer system, more specifically the computer system (based around the CPU 4) of the information processing device 1. In this example, the nonvolatile memory 2 further includes a file area storing an application configuration file for booting an application, and one or more backup file areas each storing a backup file (also referred to as the copied file) identical in content to the application configuration file. Moreover, the number of the one or more backup areas and the number of the one or more backup file areas are both plural. Furthermore, for each of the boot program, backup programs, application configuration file, and backup files, the nonvolatile memory 2 stores error detection data for detecting errors in the program or file.

The work memory 3 is used as a work area by the CPU 4 and stores programs and data read from the nonvolatile memory 2.

The CPU 4 executes programs such as the boot program stored in the nonvolatile memory 2. Specifically, the nonvolatile memory 2 stores programs and data in blocks; the CPU 4 reads (or copies) necessary blocks from the nonvolatile memory 2 into the work memory 3, accesses the work memory 3, and executes processes described in the program read into the work memory 3.

When the CPU 4 communicates with an external device (externally connected device) connected to the information processing device 1 via the external interface 6, the communication unit 5 converts the sent and received data in accordance with the communication protocol for communication with the externally connected device.

The external interface 6 is an interface, such as a universal serial bus (USB) interface, for connecting the information processing device 1 to the externally connected device.

FIG. 2 is a schematic diagram showing the storage format of the nonvolatile memory 2. In the example of FIG. 2, the nonvolatile memory 2 stores a booting program 100 for performing a boot process after the system reset of the information processing device 1 and a kernel program 106 for booting an operating system (OS) each serving as the boot program. The nonvolatile memory 2 also stores an application configuration file A 112 and an application configuration file B 114 each serving as the application configuration file and each required for booting an application operating on the kernel.

The nonvolatile memory 2 also stores, as the backup programs, a first booting program backup 102 and a second booting program backup 104 each identical in content to the booting program 100, and a first kernel program backup 108 and a second kernel program backup 110 each identical in content to the kernel program 106. The nonvolatile memory 2 also stores, as the backup files, an first application configuration file A backup 116 and an second application configuration file A backup 120 each identical in content to the application configuration file A 112, and an first application configuration file B backup 118 and an second application configuration file B backup 122 each identical in content to the application configuration file B 114.

Respective checksum values 101, 103, 105, 107, 109, 111, 113, 115, 117, 119, 121, and 123 are appended to the booting program 100, first booting program backup 102, second booting program backup 104, kernel program 106, first kernel program backup 108, second kernel program backup 110, application configuration file A 112, application configuration file B 114, first application configuration file A backup 116, first application configuration file B backup 118, second application configuration file A backup 120, and second application configuration file B backup 122, which are stored in the nonvolatile memory 2, as corresponding error detection data.

As shown in FIG. 2, the booting program 100 and its checksum value 101 are stored in the same block B1; the first booting program backup 102 and its checksum value 103 are stored in the same block B2; the second booting program backup 104 and its checksum value 105 are stored in the same block B3. Block B1 is a program area (also referred to as the genuine block); blocks B2 and B3 are backup areas (also referred to as the copied blocks). Similarly, the kernel program 106 and its checksum value 107 are stored in the same block B4; the first kernel program backup 108 and its checksum value 109 are stored in the same block B5; the second kernel program backup 110 and its checksum value 111 are stored in the same block B6. Block B4 is a program area (also referred to as the genuine area); blocks B5 and B6 are backup areas (also referred to as the copied blocks). Regarding the application configuration files, the application configuration file A 112 and its checksum value 113 and the application configuration file B 114 and its checksum value 115 are stored in the same block B7; the first application configuration file A backup 116 and its checksum value 117 and the first application configuration file B backup 118 and its checksum value 119 are stored in the same block B8; the second application configuration file A backup 120 and its checksum value 121 and the second application configuration file B backup 122 and its checksum value 123 are stored in the same block B9. Block B7 is a file area (also referred to as the genuine area); blocks B8 and B9 are backup file areas (also referred to as the copied blocks).

In addition to these, the nonvolatile memory 2 stores replacement flag information 124 used in a program replacement process and a file replacement process, which will be described later, and boot history information 126 for recording history information of system booting. The nonvolatile memory 2 may further store replacement order information 128 indicating an order of the backup programs for replacement.

FIG. 2 shows an example of the storage format of the nonvolatile memory 2, but the storage format is not limited to this.

The booting program 100 is programmed so as to cause the CPU 4 to transfer the booting program 100 itself and its checksum value 101 stored in the nonvolatile memory 2 to the work memory 3, perform an initialization process of the information processing device 1, and then make the reading destination jump to the kernel program 106. Thus, the booting program 100 describes a boot process. The booting program 100 is also programmed so as to cause the CPU 4 to execute, in parallel with the boot process, an error detection process that performs checksum calculation on the booting program 100 transferred to the work memory 3 and compares the result of the calculation with the checksum value 101 to check whether the booting program 100 has any errors (or the correctness of the booting program 100). Thus, the booting program 100 describes the error detection process and a parallel control for performing the boot process and error detection process in parallel.

The kernel program 106 is programmed so as to cause the CPU 4 to transfer the kernel program 106 itself and its checksum value 107 stored in the nonvolatile memory 2 to the work memory 3, and execute a system control process that performs system setting such as activation of peripheral devices including the communication unit 5. Thus, the kernel program 106 describes a boot process for booting the OS. The kernel program 106 is also programmed so as to cause the CPU 4 to execute, in parallel with the system control process, an error detection process that performs checksum calculation on the kernel program 106 transferred to the work memory 3 and compares the result of the calculation with the checksum value 107 in the work memory 3 to check whether the kernel program 106 has any errors (or the correctness of the kernel program 106). Thus, the kernel program 106 describes the error detection process and a parallel control for performing the boot process and error detection process in parallel.

The application configuration file A 112 is executed after the booting of the kernel program 106, and is programmed so as to cause the CPU 4 to transfer the application configuration file A 112 itself and its checksum value 113 stored in the nonvolatile memory 2 to the work memory 3 and execute a predetermined process for booting an application. Thus, the application configuration file A 112 describes a boot process for booting the application. The application configuration file A 112 is also programmed so as to cause the CPU 4 to execute, in parallel with the above process, an error detection process that performs checksum calculation on the application configuration file A 112 transferred to the work memory 3 and compares the result of the calculation with the checksum value 113 in the work memory 3 to check whether the application configuration file A 112 has any errors (or the correctness of the application configuration file A 112). Thus, the application configuration file A 112 describes the error detection process and a parallel control for performing the boot process and error detection process in parallel.

The application configuration file B 114 is similar to the application configuration file A 112, and also describes a boot process, an error detection process, and a parallel control.

In addition, each of the booting program 100, kernel program 106, application configuration file A 112, and application configuration file B 114 describes a reboot process and a replacement control.

Figure 3:
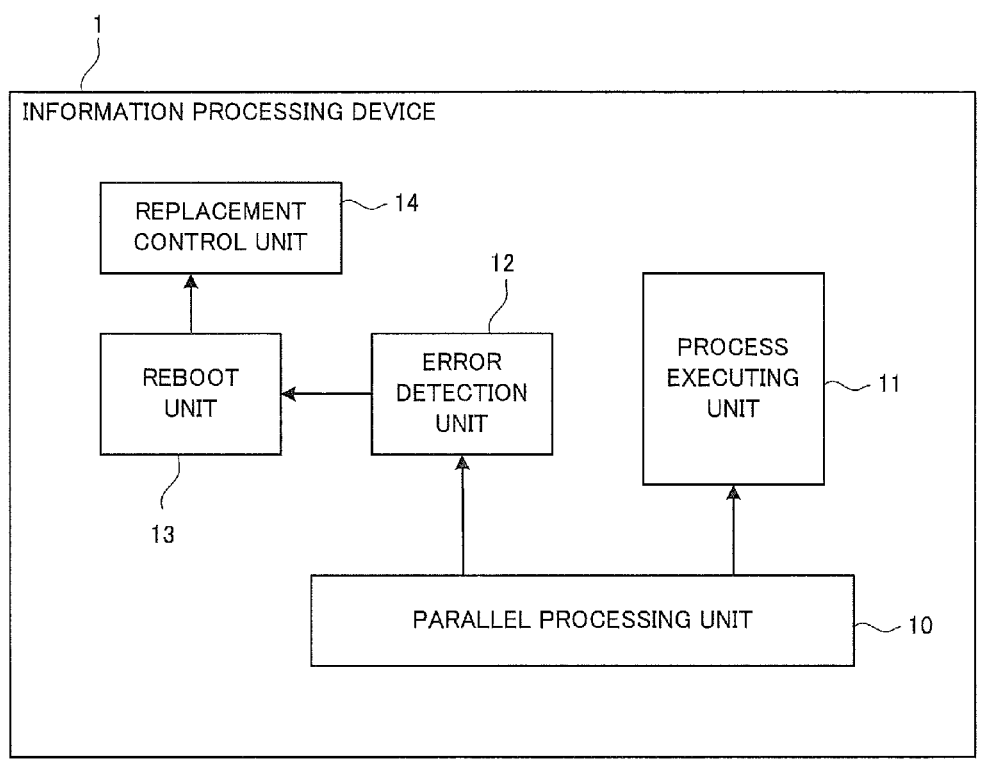
FIG. 3 is a block diagram showing the functional configuration of the information processing device in the embodiment.

FIG. 3 is a block diagram showing the functional configuration of the information processing device 1 according to this embodiment. In FIG. 3, the information processing device 1 includes a parallel processing unit 10, a process executing unit 11, an error detection unit 12, a reboot unit 13, and a replacement control unit 14.

Specifically, the parallel processing unit 10, process executing unit 11, error detection unit 12, reboot unit 13, and replacement control unit 14 are respectively implemented by execution, by the CPU 4, of the parallel controls, boot processes, error detection processes, reboot processes, and replacement controls described in the booting program 100, kernel program 106, application configuration file A 112, and application configuration file B 114.

The parallel processing unit 10 performs a control for processing multiple processes, including the boot processes and error detection processes, in parallel by time division. Specifically, the parallel processing unit 10 controls the CPU 4 so that it performs multiple processes in parallel by dividing the processing time of the CPU 4 into small segments and assigning the small time segments to the processes in turn.

The process executing unit 11 executes the boot programs stored in the program areas in the nonvolatile memory 2 to perform the boot processes for booting the system. Specifically, the process executing unit 11 executes the boot process described in the booting program 100, which is called after the system reset, executes the boot process described in the kernel program 106, which is called by the booting program 100, and executes the boot processes described in the application configuration file A 112 and application configuration file B 114, thereby executing a process to boot the applications. The process executing unit 11 may further perform arithmetic processing or other processing on the applications.

In parallel with the boot processes by the process executing unit 11, the error detection unit 12 performs error detection on the boot programs stored in the program areas and application configuration files to check the correctness of the boot programs and application configuration files. Specifically, the error detection unit 12 performs error detection on the booting program 100, kernel program 106, application configuration file A 112, and application configuration file B 114 using the respective error detection data. More specifically, the error detection unit 12 calculates checksum values for the booting program 100, kernel program 106, application configuration file A 112, and application configuration file B 114 stored in the nonvolatile memory 2, compares the calculated checksum values with the corresponding checksum values stored in advance in the nonvolatile memory 2 to detect whether the boot programs and files have been improperly changed, and notifies the reboot unit 13 of the detection results.

When the error detection unit 12 detects an error in a boot program (the booting program 100 or kernel program 106), the reboot unit 13 reboots the system by using a backup program (the first booting program backup 102, second booting program backup 104, first kernel program backup 108, or second kernel program backup 110) stored in the backup areas in order to prevent the system from failing to be booted or freezing. In this example, when the error detection unit 12 detects an error in a boot program, the reboot unit 13 performs a recovery process to replace the boot program stored in the program area with a backup program stored in the backup areas, and reboots the system using the replaced boot program. When performing the recovery process, the reboot unit 13 refers to history information indicating a history of replacement of the boot program with the backup programs (or history information regarding a history in which the boot program has been replaced with the backup programs), selects the backup program to be used for the replacement from among the backup programs based on the history information, and replaces the boot program stored in the program area with the selected backup program. The history information is included in the boot history information 126 in the nonvolatile memory 2. The reboot unit 13 may further refer to replacement order information indicating an order of the backup programs for the replacement, select the backup program to be used for the replacement from among the backup programs based on the replacement order information and history information, and replace the boot program stored in the program area with the selected backup program. The replacement order information indicates an order in which the backup programs are to be used for the replacement, and is included in the replacement order information 128 in the nonvolatile memory 2. When performing the recovery process, the reboot unit 13 selects the backup program to be used for the replacement in the recovery process based on the history information so that the backup programs are used in the order indicated by the replacement order information. In one aspect, when performing the recovery process, the reboot unit 13 selects, based on the history information (or the history information and replacement order information), a backup program that has not been used for the replacement from among the backup programs stored in the backup areas, and replaces the boot program stored in the program area with the selected backup program. On the other hand, when the error detection unit 12 detects an error in the boot program, if the backup areas include no backup program that has not been used for the replacement, the reboot unit 13 causes the replacement control unit 14 to execute the program replacement process, which will be described later.

When the error detection unit 12 detects an error in an application configuration file (the application configuration file A 112 or B 114), the reboot unit 13 reboots the application using a backup file (the first application configuration file A backup 116, second application configuration file A backup 120, first application configuration file B backup 118, or second application configuration file B backup 122) stored in the backup file areas. In this example, when the error detection unit 12 detects an error in an application configuration file, the reboot unit 13 performs a recovery process to replace the application configuration file stored in the file area with a backup file stored in the backup file areas, and reboots the application using the replaced application configuration file. When performing the recovery process, the reboot unit 13 refers to history information indicating a history of replacement of the application configuration file with the backup files (or history information regarding a history in which the application configuration file has been replaced with the backup files), selects the backup file to be used for the replacement from among the backup files based on the history information, and replaces the application configuration file stored in the file area with the selected backup file. The history information is included in the boot history information 126 in the nonvolatile memory 2. The reboot unit 13 may further refer to replacement order information indicating an order of the backup files for the replacement, select the backup file to be used for the replacement from among the backup files based on the replacement order information and history information, and replace the application configuration file stored in the file area with the selected backup file. The replacement order information indicates an order in which the backup files are to be used for the replacement, and is included in the replacement order information 128 in the nonvolatile memory 2. When performing the recovery process, the reboot unit 13 selects the backup program to be used for the replacement in the recovery process based on the history information so that the backup files are used in the order indicated by the replacement order information. In one aspect, when performing the recovery process, the reboot unit 13 selects, based on the history information (or the history information and replacement order information), a backup file that has not been used for the replacement from among the backup files stored in the backup file areas, and replaces the application configuration file stored in the file area with the selected backup file. On the other hand, when the error detection unit 12 detects an error in the application configuration file, if the backup file areas include no backup file that has not been used for the replacement, the reboot unit 13 causes the replacement control unit 14 to execute the file replacement process, which will be described later.

When the reboot unit 13 replaces a boot program with a backup program in the recovery process, it copies the backup program stored in the backup area to the program area as the new boot program, or overwrites the boot program stored in the program area with the backup program stored in the backup area, for example. The same applies to a case where an application configuration file is replaced with a backup file.

The replacement control unit 14 performs the program replacement process to obtain a new boot program from an external source and replace a boot program with the new boot program. When an error is detected in a boot program (the booting program 100 or kernel program 106), if the backup areas include no backup program that has not been used for the replacement, the program replacement process is executed. The program replacement process is also executed when a boot program (the booting program 100 or kernel program 106) is updated. In this example, in the program replacement process, the replacement control unit 14 obtains a new boot program for replacement from a source external to the information processing device 1, replaces a predetermined backup program of the backup programs stored in the backup areas with the new boot program, and replaces the boot program stored in the program area with the replaced predetermined backup program. Then, when the replaced boot program is executed, if there is no fault, the replacement control unit 14 replaces all of the backup programs other than the predetermined backup program with the replaced predetermined backup program or the replaced boot program, and if there is a fault, it replaces the boot program stored in the program area with a backup program other than the predetermined backup program.

The replacement control unit 14 also performs the file replacement process to obtain a new application configuration file from an external source and replace an application configuration file with the new application configuration file. When an error is detected in an application configuration file (the application configuration file A 112 or B 114), if the backup file areas include no backup file that has not been used for the replacement, the file replacement process is executed. The file replacement process is also executed when an application configuration file (the application configuration file A 112 or B 114) is updated. In this example, in the file replacement process, the replacement control unit 14 obtains a new application configuration file for replacement from a source external to the information processing device 1, replaces a predetermined backup file of the backup files stored in the backup file areas with the new application configuration file, and replaces the application configuration file stored in the file area with the replaced predetermined backup file. Then, when the replaced application configuration file is executed, if there is no fault, the replacement control unit 14 replaces all of the backup files other than the predetermined backup file with the replaced predetermined backup file or the replaced application configuration file, and if there is a fault, it replaces the application configuration file stored in the file area with a backup file other than the predetermined backup file.

When the replacement control unit 14 replaces a backup program with a new boot program, it copies the new boot program to the backup area as the new backup program, or overwrites the backup program stored in the backup area with the new boot program, for example. The same applies to a case where a boot program is replaced with a backup program, a case where a backup file is replaced with a new application configuration file, and the like.

In the program replacement process and file replacement process, the new boot program and application configuration file obtained from the external source by the replacement control unit 14 may be identical to the boot program and application configuration file currently stored in the nonvolatile memory 2, or may be newer versions than the currently stored boot program and application configuration file.

<Operation of Information Processing Device>

Figure 4:
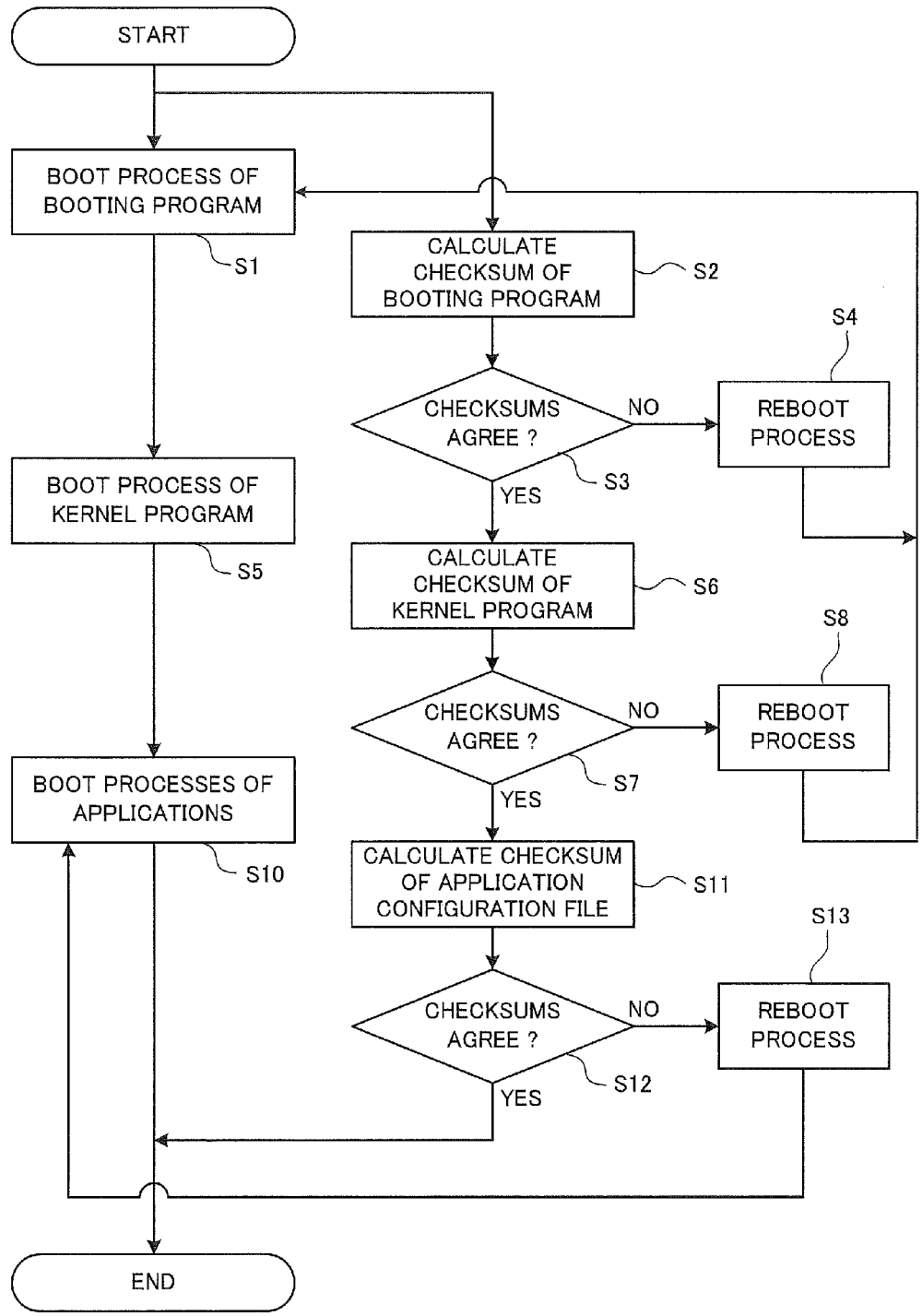
FIG. 4 is a flowchart showing the operation of the information processing device in the embodiment.

FIG. 4 is a flowchart showing the operation of the information processing device 1 according to this embodiment. The operation of the information processing device 1 will be described below with reference to FIG. 4.

When the system reset is released, the CPU 4 accesses a predetermined address (hereinafter referred to as the 'boot address') at which the booting program 100 is stored in the nonvolatile memory 2 and transfers the booting program 100 and its checksum value 101 to the work memory 3. Then, the CPU 4 reads the booting program 100 from the work memory 3 and executes the boot process, including the initialization process, described in the booting program 100 (S1). In this example, the boot address is a fixed address.

Next, in accordance with instructions described in the booting program 100, the CPU 4 jumps to the address at which the kernel program 106 is stored and transfers the kernel program 106 and its checksum value 107 to the work memory 3. Then, the CPU 4 reads the kernel program 106 from the work memory 3 and executes the boot process described in the kernel program 106 (S5).

Next, when the booting of the kernel program 106 is completed, the CPU 4 transfers the application configuration files A 112 and B 114 for booting the applications specified in advance in the kernel and the respective checksum values 113 and 115 from the nonvolatile memory 2 to the work memory 3. Then, the CPU 4 reads the application configuration files A 112 and B 114 from the work memory 3 and executes the boot processes described in the application configuration files A 112 and B 114 to boot the applications, providing the intended applications to a user (S10). The application configuration files A 112 and B 114 may be executed sequentially one by one or may be executed in parallel.

Meanwhile, by executing the parallel control described in the booting program 100, in parallel with the boot process of the booting program 100 in step S1, the CPU 4 executes the error detection process described in the booting program 100 and calculates the checksum value of the booting program 100 (S2). The CPU 4 then determines whether the calculated checksum value agrees with the checksum value 101 of the booting program 100 (S3). If the two do not agree (NO in step S3), the CPU 4 determines that the booting program 100 has an improper bit change and proceeds to the reboot process (S4). In this reboot process, the CPU 4 performs the recovery process to replace the booting program 100 with the first booting program backup 102 or second booting program backup 104 and reboots the system using the replaced booting program 100. The reboot process (S4) will be detailed later.

On the other hand, if the calculated checksum value of the booting program 100 agrees with the checksum value 101 (YES in step S3), the CPU 4 determines that the booting program 100 is free of improper bit changes, and calculates the checksum value of the kernel program 106, which is read following the booting program 100 (S6). The CPU 4 then determines whether the calculated checksum value agrees with the checksum value 107 of the kernel program 106 (S7). If the two do not agree (NO in step S7), the CPU 4 determines that the kernel program 106 has an improper bit change and proceeds to the reboot process (S8). In this reboot process, the CPU 4 performs the recovery process to replace the kernel program 106 with the first kernel program backup 108 or second kernel program backup 110 and reboots the system using the replaced kernel program 106. The reboot process (S8) will be detailed later.

On the other hand, if the calculated checksum value of the kernel program 106 agrees with the checksum value 107 (YES in step S7), the CPU 4 determines that the kernel program 106 is free of improper bit changes, and calculates the checksum value of the application configuration file A 112, which is read following the kernel program 106 (S11). The CPU 4 then determines whether the calculated checksum value agrees with the checksum value 113 of the application configuration file A 112 (S12). If the two do not agree (NO in step S12), the CPU 4 determines that the application configuration file A 112 has an improper bit change and proceeds to the reboot process (S13). In this reboot process, the CPU 4 performs the recovery process to replace the application configuration file A 112 with the first application configuration file A backup 116 or second application configuration file A backup 120 and reboots the application using the replaced application configuration file A 112. The reboot process (S13) will be detailed later.

On the other hand, if the calculated checksum value of the application configuration file A 112 agrees with the checksum value 113 (YES in step S12), the CPU 4 determines that the application configuration file A 112 is free of improper bit changes. Then, if another application configuration file is read, the CPU 4 performs, on the read application configuration file, the same process as that performed on the application configuration file A 112 (S11, S12); if no other application configuration file is read, it enters a waiting state. For example, when the application configuration file B 114 is read following the application configuration file A 112, the CPU 4 performs the process on the application configuration file B 114 following the process on the application configuration file A 112 (S11, S12), entering the waiting state. When the application configuration file B 114 is executed in parallel with the application configuration file A 112, the CPU 4 may perform the process on the application configuration file B 114 in parallel with the process on the application configuration file A 112.

Steps S1, S5, and S10 in FIG. 4 are implemented by execution, by the CPU 4, of the boot processes described in the booting program, kernel program, and application configuration files, respectively. Steps S2 and S3, S6 and S7, and S11 and S12 are implemented by execution, by the CPU 4, of the error detection processes described in the booting program, kernel program, and application configuration files, respectively. Steps S4, S8, and S13 are implemented by execution, by the CPU 4, of the reboot processes described in the booting program, kernel program, and application configuration files, respectively. Thus, steps S1, S5, and S10 are processes in the process executing unit 11; steps S2, S3, S6, S7, S11, and S12 are processes in the error detection unit 12; and step S4, S8, and S13 are processes in the reboot unit 13.

<Reboot Process>

Figure 5:
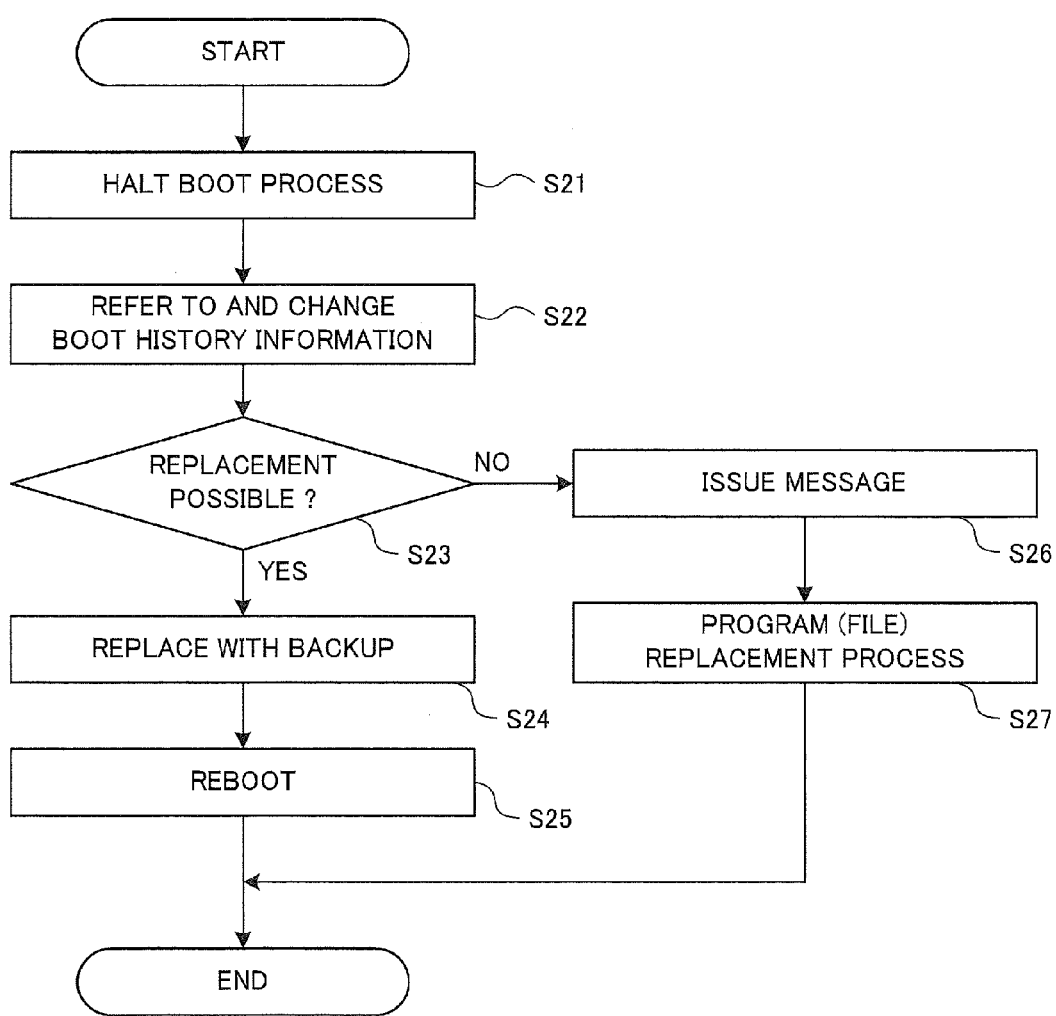
FIG. 5 is a flowchart showing a reboot process.

FIG. 5 is a flowchart showing the reboot process. The reboot processes in steps S4, S8, and S13 in FIG. 4 will be described below with reference to FIG. 5.

First, the reboot process in step S4 will be described. In the reboot process in step S4, as shown in FIG. 5, the CPU 4 halts the boot process (the process in step S1) first (S21). Then, the CPU 4 refers to and changes the boot history information 126 stored in the nonvolatile memory 2 (S22).

Figure 6:
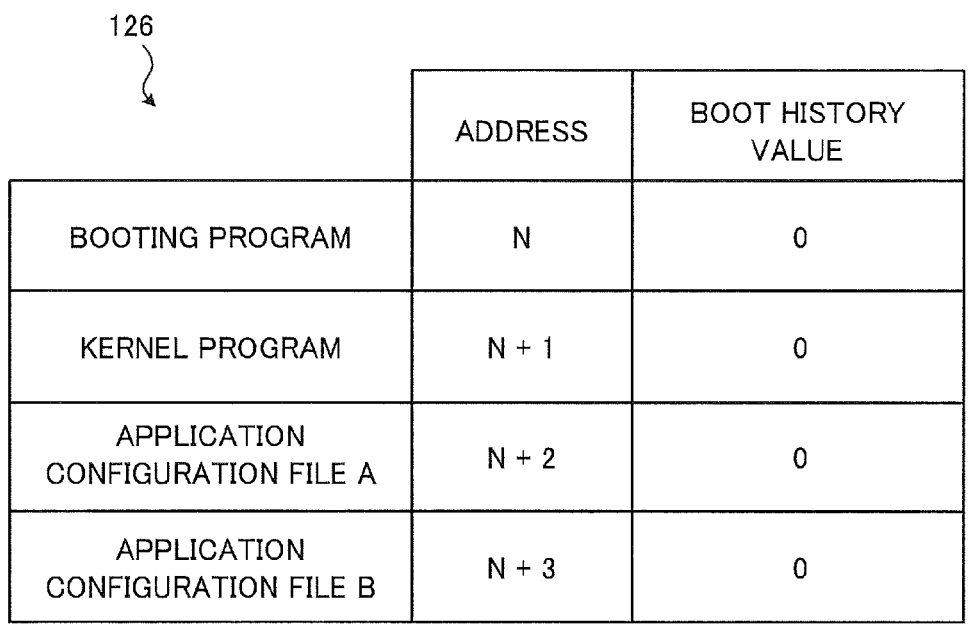
FIG. 6 is a schematic diagram showing the format of boot history information.

Here, the boot history information 126 will be described. In this example, the boot history information 126 indicates replacement sources (or copy sources) of the programs and files being used for booting. FIG. 6 is a diagram showing the format of the boot history information 126. In FIG. 6, the boot history information 126 includes a boot history value for each of the booting program 100, kernel program 106, application configuration file A 112, and application configuration file B 114. The boot history values for the booting program 100, kernel program 106, application configuration file A 112, and application configuration file B 114 are recorded at addresses N, N+1, N+2, and N+3 in the nonvolatile memory 2, respectively. When the booting program 100 is booted for the first time, '0' has been recorded at address N; the value at address N is kept at '0' until the reboot process (S4) is performed. After the reboot process (S4) is performed, when the booting program 100 is a program replaced with the first booting program backup 102, '1' is recorded at address N; when the booting program 100 is a program replaced with the second booting program backup 104, '2' is recorded at address N. Thus, at address N, '0', '1', or '2' is recorded; the boot history value '0' indicates that the booting program 100 stored in block B1 is not a program replaced in the reboot process (S4), that is, is an initial program; the boot history value '1' indicates that the booting program 100 stored in block B1 is a program replaced with the first booting program backup 102 in the reboot process (S4); the boot history value '2' indicates that the booting program 100 stored in block B1 is a program replaced with the second booting program backup 104 in the reboot process (S4). Accordingly, the CPU 4 can recognize a program that is a replacement source (or copy source) of the booting program 100 currently being used for booting by referring to the boot history value at address N in the boot history information 126.

In this example, the order of replacement of the booting program 100 in the reboot process (S4) is defined so that the first booting program backup 102 is used for the replacement in the first reboot process and the second booting program backup 104 is used for the replacement in the next reboot process. The same applies to the kernel program 106, application configuration file A 112, and application configuration file B 114.

For example, the nonvolatile memory 2 stores the replacement order information 128 indicating the replacement order of the backup programs or backup files for each of the booting program 100, kernel program 106, application configuration file A 112, and application configuration file B 114; the CPU 4 determines the replacement order with reference to the replacement order information 128. Specifically, the CPU 4 performs the processing in and after step S22 based on the replacement order information 128. In this configuration, the replacement order can be changed by changing the replacement order information. For example, the manufacturer of the information processing device 1 can set the replacement order to an intended order by recording the replacement order information indicating the intended order into the nonvolatile memory 2. The information processing device 1 may change the replacement order information according to information on an error detection rate of each block or other information, or operations from a user, for example.

Returning to FIG. 5, in step S22, when the boot history value for the booting program 100 is '0', since the booting program 100 is to be replaced with the first booting program backup 102, the CPU 4 changes the boot history value for the booting program 100 to '1'; when the boot history value for the booting program 100 is '1', since the booting program 100 is to be replaced with the second booting program backup 104, the CPU 4 changes the boot history value for the booting program 100 to '2'; when the boot history value for the booting program 100 is '2', the CPU 4 does not change the boot history value for the booting program 100.

Then, the CPU 4 determines whether it is possible to replace the booting program 100 with a backup program (S23). Specifically, if the boot history value at address N for the booting program 100 is '0' or '1', the CPU 4 determines that replacement is possible; if the boot history value is '2', it determines that replacement is impossible. The determination in step S23 is performed based on the boot history value referred to in step S22, that is, the boot history value before being changed in step S22.

If it is determined that replacement is possible (YES in step S23), the CPU 4 replaces the booting program 100 and its checksum value 101 stored in block B1 with a backup program and its checksum value (S24). Specifically, when the boot history value for the booting program 100 is '0', the CPU 4 copies the first booting program backup 102 and its checksum value 103 to block B1 as the new booting program 100 and its checksum value 101; when the boot history value for the booting program 100 is '1', it copies the second booting program backup 104 and its checksum value 105 to block B1 as the new booting program 100 and its checksum value 101. When the replacement of the booting program 100 and its checksum value 101 is completed, the CPU 4 reboots the system (S25). Specifically, when the replacement is completed, the CPU 4 executes a software reset and accesses the boot address to perform the process in FIG. 4 from the beginning. That is, in FIG. 4, the processing returns from step S4 to step S1, and the boot process of the booting program 100 is performed again. In this case, the booting program 100 after the replacement is read and executed. The process in step S24 is performed based on the boot history value referred to in step S22, that is, the boot history value before being changed in step S22.

On the other hand, if it is determined that replacement of the booting program 100 is impossible (NO in step S23), the CPU 4 outputs a message informing that a new booting program must be obtained from an external source to a display unit (not shown) or the like (S26), and proceeds to the program replacement process for replacing the booting program with a booting program from an external source (S27). The program replacement process will be detailed later.

The above description illustrates the case where the first booting program backup 102 and second booting program backup 104 are used for the replacement of the booting program 100 in this order, but they may be used in the order of the second booting program backup 104 and first booting program backup 102. In this case, when the boot history value for the booting program 100 is '0', the CPU 4 changes the boot history value to '2' and replaces the booting program 100 with the second booting program backup 104; when the boot history value is '2', it changes the boot history value to '1' and replaces the booting program 100 with the first booting program backup 102; when the boot history value is '1', it performs the program replacement process without changing the boot history value. The same applies to the kernel program 106, application configuration file A 112, and application configuration file B 114.

Next, the reboot process in step S8 will be described. In the reboot process in step S8, as shown in FIG. 5, the CPU 4 halts the boot process (the process in step S5) first (S21). The CPU 4 then refers to and changes the boot history value at address N+1 in the boot history information 126 stored in the nonvolatile memory 2 (S22).

Here, the boot history value at address N+1 in the boot history information 126 will be described. In FIG. 6, as in the case of address N, '0', '1', or '2' is recorded at address N+1 in the boot history information 126 as the boot history value for the kernel program 106. For the kernel program 106, the boot history value '0' indicates that the kernel program 106 stored in block B4 is not a program replaced in the reboot process (S8); the boot history value '1' indicates that the kernel program 106 stored in block B4 is a program replaced with the first kernel program backup 108 in the reboot process (S8); the boot history value '2' indicates that the kernel program 106 stored in block B4 is a program replaced with the second kernel program backup 110 in the reboot process (S8).

Returning to FIG. 5, in step S22, when the boot history value for the kernel program 106 is '0', since the kernel program 106 is to be replaced with the first kernel program backup 108, the CPU 4 changes the boot history value for the kernel program 106 to '1'; when the boot history value for the kernel program 106 is '1', since the kernel program 106 is to be replaced with the second kernel program backup 110, the CPU 4 changes the boot history value for the kernel program 106 to '2'; when the boot history value for the kernel program 106 is '2', the CPU 4 does not change the boot history value for the kernel program 106.

Then, the CPU 4 determines whether it is possible to replace the kernel program 106 with a backup program (S23). Specifically, if the boot history value at address N+1 for the kernel program 106 is '0' or '1', the CPU 4 determines that replacement is possible; if the boot history value is '2', it determines that replacement is impossible. The determination in step S23 is performed based on the boot history value referred to in step S22, that is, the boot history value before being changed in step S22.

If it is determined that replacement is possible (YES in step S23), the CPU 4 replaces the kernel program 106 and its checksum value 107 stored in block B4 with a backup program and its checksum value (S24). Specifically, when the boot history value for the kernel program 106 is '0', the CPU 4 copies the first kernel program backup 108 and its checksum value 109 to block B4 as the new kernel program 106 and its checksum value 107; when the boot history value for the kernel program 106 is '1', it copies the second kernel program backup 110 and its checksum value 111 to block B4 as the new kernel program 106 and its checksum value 107. When the replacement of the kernel program 106 and the checksum value 107 is completed, the CPU 4 reboots the system (S25). Specifically, when the replacement is completed, the CPU 4 executes a software reset and accesses the boot address, at which the booting program 100 is stored, to perform the process in FIG. 4 from the beginning. That is, in FIG. 4, the processing returns from step S8 to step S1, and the boot process of the booting program 100 is performed again. In the processing after the reboot, the kernel program 106 after the replacement is read and executed. The process in step S24 is performed based on the boot history value referred to in step S22, that is, the boot history value before being changed in step S22.

On the other hand, if it is determined that replacement of the kernel program 106 is impossible (NO in step S23), the CPU 4 outputs a message informing that a new kernel program must be obtained from an external source (S26), and proceeds to the program replacement process for replacing the kernel program 106 with a kernel program from an external source (S27). The program replacement process will be detailed later.

Next, the reboot process in step S13 will be described. In the reboot process in step S13, as shown in FIG. 5, the CPU 4 halts the boot process (the process in step S10) first (S21). The CPU 4 then refers to and changes the boot history value at address N+2 in the boot history information 126 stored in the nonvolatile memory 2 (S22).

Here, the boot history value at address N+2 in the boot history information 126 will be described. In FIG. 6, as in the case of the address N, '0', '1', or '2' is recorded at address N+2 in the boot history information 126 as the boot history value for the application configuration file A 112. For the application configuration file A 112, the boot history value '0' indicates that the application configuration file A 112 stored in block B7 is not a file replaced in the reboot process (S13); the boot history value '1' indicates that the application configuration file A 112 stored in block B7 is a file replaced with the first application configuration file A backup 116 in the reboot process (S13); the boot history value '2' indicates that the application configuration file A 112 stored in block B7 is a file replaced with the second application configuration file A backup 120 in the reboot process (S13).

Returning to FIG. 5, in step S22, when the boot history value for the application configuration file A 112 is '0', since the application configuration file A 112 is to be replaced with the first application configuration file A backup 116, the CPU 4 changes the boot history value for the application configuration file A 112 to '1'; when the boot history value for the application configuration file A 112 is '1', since the application configuration file A 112 is to be replaced with the second application configuration file A backup 120, the CPU 4 changes the boot history value for the application configuration file A 112 to '2'; when the boot history value for the application configuration file A 112 is '2', the CPU 4 does not change the boot history value for the application configuration file A 112.

Then, the CPU 4 determines whether it is possible to replace the application configuration file A 112 with a backup file (S23). Specifically, if the boot history value at address N+2 for the application configuration file A 112 is '0' or '1', the CPU 4 determines that replacement is possible; if the boot history value is '2', it determines that replacement is impossible. The determination in step S23 is performed based on the boot history value referred to in step S22, that is, the boot history value before being changed in step S22.

If it is determined that replacement is possible (YES in step S23), the CPU 4 replaces the application configuration file A 112 and its checksum value 113 stored in block B7 with a backup file and its checksum value (S24). Specifically, when the boot history value for the application configuration file A 112 is '0', the CPU 4 copies the first application configuration file A backup 116 and its checksum value 117 to block B7 as the new application configuration file A 112 and its checksum value 113; when the boot history value for the application configuration file A 112 is '1', it copies the second application configuration file A backup 120 and its checksum value 121 to block B7 as the new application configuration file A 112 and its checksum value 113. When the replacement of the application configuration file A 112 and the checksum value 113 is completed, the CPU 4 reboots the application (S25). Specifically, when the replacement is completed, the CPU 4 loads again the application configuration file A 112 in the state where the system (specifically, the kernel) has been booted. Thus, in FIG. 4, the processing moves from step S13 to step S10, and the application configuration file A 112 is read and the boot process of the application is performed again. In this case, the application configuration file A 112 after the replacement is read and executed. The process in step S24 is performed based on the boot history value referred to in step S22, that is, the boot history value before being changed in step S22.

On the other hand, if it is determined that replacement of the application configuration file A 112 is impossible (NO in step S23), the CPU 4 outputs a message informing that a new application configuration file must be obtained from an external source (S26), and proceeds to the file replacement process for replacing the application configuration file A 112 with an application configuration file from an external source (S27). The file replacement process will be detailed later.

The reboot process for the application configuration file B 114 is the same as that for the application configuration file A 112.

As such, when the booting program 100, kernel program 106, application configuration file A 112, or application configuration file B 114 is replaced with a backup program, the backup program used for the replacement is selected with reference to the boot history information 126. This makes it possible to select a backup program that does not meet the condition that it was used for the replacement of the program and an error was detected in the replaced program (or to select a backup program in which an error has not been detected), so that the reboot process can be performed with a more reliable backup program. For example, immediately after a boot program is replaced with a first backup, when an error is detected in the boot program, it is possible to select a backup program (e.g., a second backup) other than the first backup, which is likely to have an error, to perform the reboot process, so that the reboot process can be performed with a more reliable backup program.

<Program (File) Replacement Process>

Figure 7:
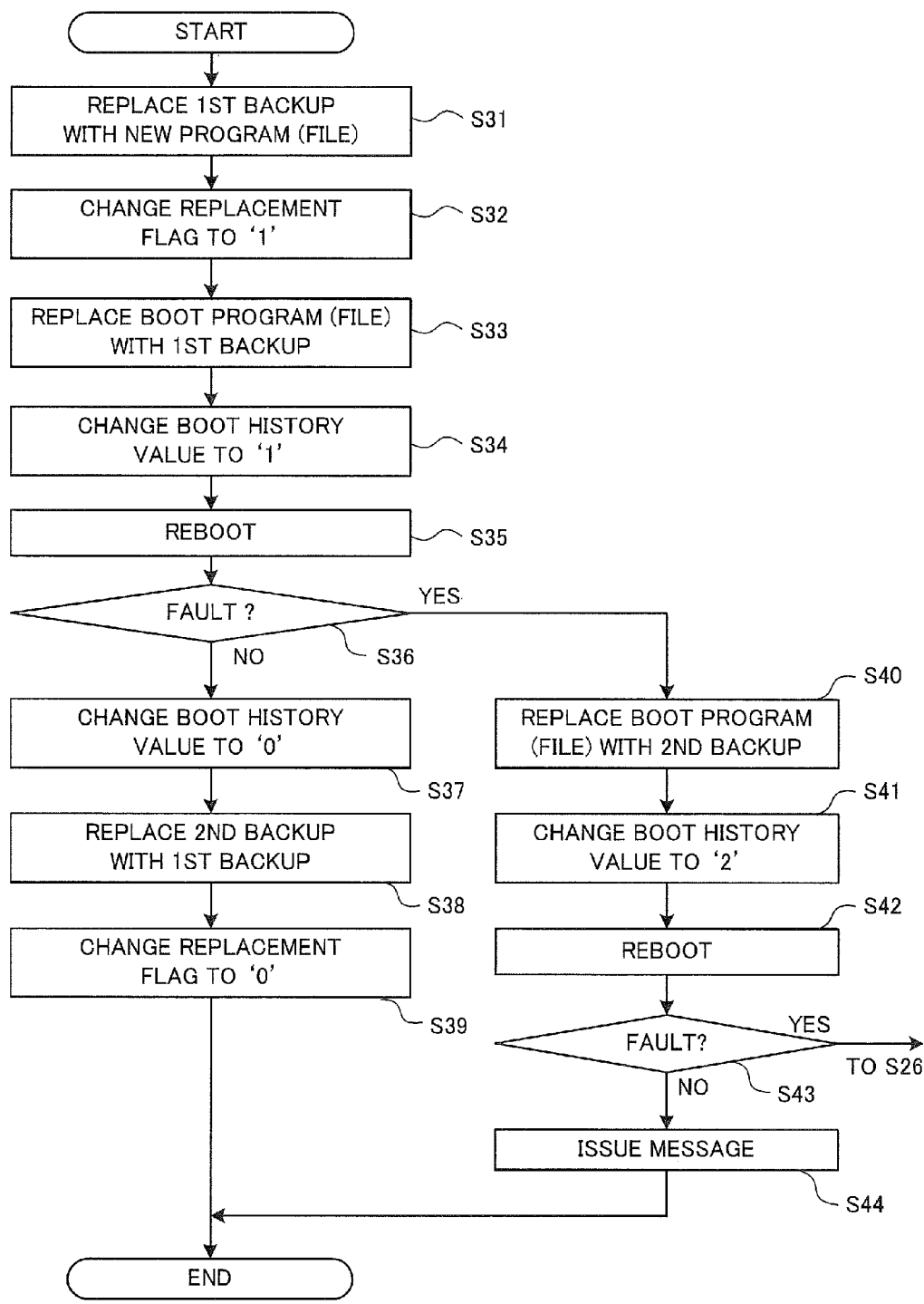
FIG. 7 is a flowchart showing a program (or file) replacement process.

FIG. 7 is a flowchart showing the program (or file) replacement process in step S27 in FIG. 5. The program replacement process for the booting program, the program replacement process for the kernel program, and the file replacement process for the application configuration file will be described below with reference to FIG. 7. The program (or file) replacement processes for the booting program, kernel program, and application configuration file are implemented by execution, by the CPU 4, of the replacement controls described in the booting program, kernel program, and application configuration file, respectively.

First, the program replacement process for the booting program will be described. In the program replacement process for the booting program, as shown in FIG. 7, when the CPU 4 recognizes that an external memory has been connected to the external interface 6, it reads a new booting program for replacement and its checksum value from the external memory through the communication unit 5 and replaces the first booting program backup 102 and the checksum value 103 with the new booting program and its checksum value (S31). The external memory is connected to the external interface 6 of the information processing device 1 by, for example, a user who has seen the message in step S26 in FIG. 5, and is, for example, a portable memory such as a USB memory.

When the replacement is completed, the CPU 4 changes the replacement flag information 124 (S32).

Here, the replacement flag information 124 will be described. The replacement flag information 124 indicates whether the program (or file) replacement process is being executed. FIG. 8 is a diagram showing the format of the replacement flag information 124. In FIG. 8, the replacement flag information 124 includes a replacement flag for each of the booting program 100, kernel program 106, application configuration file A 112, and application configuration file B 114. The replacement flags for the booting program 100, kernel program 106, application configuration file A 112, and application configuration file B 114 are recorded at addresses M, M+1, M+2, and M+3 in the nonvolatile memory 2, respectively. Each of the replacement flags is normally '0' and is changed to '1' when the program (or file) replacement process is executed. At each of addresses M, M+1, M+2, and M+3, '0' or '1' is recorded; '0' indicates that the replacement process for the corresponding program (or file) is not being performed; '1' indicates that the replacement process for the corresponding program (or file) is being performed.

Returning to FIG. 7, in step S32, the CPU 4 changes the replacement flag at address M for the booting program 100 from '0' to '1'. The replacement flag '1' for the booting program 100 indicates that the first booting program backup 102 has been replaced with a new booting program and thus differs in content, from the booting program 100 and second booting program backup 104.

Then, the CPU 4 replaces the booting program 100 and checksum value 101 with the replaced first booting program backup 102 and checksum value 103 (S33).

When the replacement is completed, the CPU 4 changes the boot history value for the booting program 100 in the boot history information 126 to '1' (S34) and reboots the system (S35). Specifically, the CPU 4 executes a software reset, accesses the boot address, and reads and executes the replaced booting program 100 to perform the boot process (step S1 in FIG. 4) and the checksum calculation (step S2 in FIG. 4) in parallel.

When the checksum calculation ends, the CPU 4 refers to the replacement flag and boot history value for the booting program 100 and, if the replacement flag and boot history value are both '1', proceeds to step S36 in FIG. 7. If the replacement flag is '0', it proceeds to step S3 in FIG. 4; if the replacement flag is '1' and the boot history value is '2', it proceeds to step S43 described later.

In step S36, the CPU 4 determines whether the booting program 100 has any faults. Specifically, if the booting program 100 boots normally and the calculated checksum value agrees with the checksum value 101, the CPU 4 determines that there is no fault; if the booting program 100 does not boot normally, or if the two checksum values do not agree, it determines that there is a fault.

If it is determined that there is no fault (NO in step S36), the CPU 4 changes the boot history value for the booting program 100 to '0' (S37) and replaces the second booting program backup 104 with the first booting program backup 102 (S38). Then, the CPU 4 returns the replacement flag for the booting program 100 to '0' (S39) and ends the program replacement process. After the program replacement process ends, the processing proceeds to step S6 in FIG. 4.

On the other hand, if it is determined that there is a fault (YES in step S36), the CPU 4 replaces the booting program 100 with the second booting program backup 104 (S40), changes the boot history value for the booting program 100 to '2' (S41), and reboots the system (S42). Specifically, the CPU 4 executes a software reset, accesses the boot address, and reads and executes the replaced booting program 100 to perform the boot process (step S1 in FIG. 4) and the checksum calculation (step S2 in FIG. 4) in parallel.

When the checksum calculation ends, the CPU 4 refers to the replacement flag and boot history value for the booting program 100 and, if the replacement flag is '1' and the boot history value is '2', it proceeds to step S43 in FIG. 7.

In step S43, the CPU 4 determines whether the booting program 100 has any faults in the same way as in step S36.

If it is determined that there is no fault (NO in step S43), the CPU 4 informs a user that the new booting program obtained from the external source is faulty by, for example, displaying it on a display unit (not shown) in step S44, and ends the program replacement process. After the program replacement process ends, the processing proceeds to step S6 in FIG. 4.

On the other hand, if it is determined that there is a fault (YES in step S43), the CPU 4 returns to step S26 in FIG. 5, outputs again the message informing that a new booting program must be obtained from an external source, and executes the program replacement process (S27).

Next, the program replacement process for the kernel program will be described. In the program replacement process for the kernel program, as shown in FIG. 7, when the CPU 4 recognizes that an external memory has been connected to the external interface 6, it reads a new kernel program for replacement and its checksum value from the external memory and replaces the first kernel program backup 108 and the checksum value 109 with the new kernel program and checksum value (S31).

When the replacement is completed, the CPU 4 changes the replacement flag at address M+1 for the kernel program 106 in the replacement flag information 124 from '0' to '1' (S32).

Then, the CPU 4 replaces the kernel program 106 and the checksum value 107 with the replaced first kernel program backup 108 and checksum value 109 (S33).

When the replacement is completed, the CPU 4 changes the boot history value for the kernel program 106 in the boot history information 126 to '1' (S34) and reboots the system (S35). Specifically, the CPU 4 executes a software reset, accesses the boot address, reads and executes the booting program 100, and then reads the kernel program 106 to perform the boot process of the kernel program 106 (step S5 in FIG. 4) and the checksum calculation (step S6 in FIG. 4) in parallel.

When the checksum calculation ends, the CPU 4 refers to the replacement flag and boot history value for the kernel program 106 and, if the replacement flag and boot history value are both '1', proceeds to step S36 in FIG. 7. If the replacement flag is '0', it proceeds to step S7 in FIG. 4; if the replacement flag is '1' and the boot history value is '2', it proceeds to step S43 described later.

In step S36, the CPU 4 determines whether the kernel program 106 has any faults. Specifically, if the kernel program 106 boots normally and the calculated checksum value agrees with the checksum value 107, the CPU 4 determines that there is no fault; if the kernel program 106 does not boot normally, or if the two checksum values do not agree, it determines that there is a fault.

If it is determined that there is no fault (NO in step S36), the CPU 4 changes the boot history value for the kernel program 106 to '0' (S37) and replaces the second kernel program backup 110 with the first kernel program backup 108 (S38). Then, the CPU 4 returns the replacement flag for the kernel program 106 to '0' (S39) and ends the program replacement process. After the program replacement process ends, the processing proceeds to step S11 in FIG. 4.

On the other hand, if it is determined that there is a fault (YES in step S36), the CPU 4 replaces the kernel program 106 with the second kernel program backup 110 (S40), changes the boot history value for the kernel program 106 to '2' (S41), and reboots the system (S42). Specifically, the CPU 4 executes a software reset, accesses the boot address, reads and executes the booting program 100, and then reads the kernel program 106 to perform the boot process of the kernel program 106 (step S5 in FIG. 4) and the checksum calculation (step S6 in FIG. 4) in parallel.

When the checksum calculation ends, the CPU 4 refers to the replacement flag and boot history value for the kernel program 106 and, if the replacement flag is '1' and the boot history value is '2', it proceeds to step S43 in FIG. 7.

In step S43, the CPU 4 determines whether the kernel program 106 has any faults in the same way as in step S36.

If it is determined that there is no fault (NO in step S43), the CPU 4 informs a user that the new kernel program obtained from the external source is faulty (S44), and ends the program replacement process. After the program replacement process ends, the processing proceeds to step S11 in FIG. 4.

On the other hand, if it is determined that there is a fault (YES in step S43), the CPU 4 returns to step S26 in FIG. 5, outputs again the message informing that a new kernel program must be obtained from an external source, and executes the program replacement process (S27).

Next, the file replacement process for the application configuration file will be described. In the file replacement process for the application configuration file A 112, as shown in FIG. 7, when the CPU 4 recognizes that an external memory has been connected to the external interface 6, it reads a new application configuration file for replacement and its checksum value from the external memory and replaces the first application configuration file A backup 116 and the checksum value 117 with the new application configuration file and checksum value (S31).

When the replacement is completed, the CPU 4 changes the replacement flag at address M+2 for the application configuration file A 112 in the replacement flag information 124 from '0' to '1' (S32).

Then, the CPU 4 replaces the application configuration file A 112 and the checksum value 113 with the replaced first application configuration file A backup 116 and checksum value 117 (S33).

When the replacement is completed, the CPU 4 changes the boot history value for the application configuration file A 112 in the boot history information 126 to '1' (S34) and reboots the application (S35). Specifically, the CPU 4 reads again the application configuration file A 112 in the state where the system (specifically, the kernel) has been booted, and performs the boot process of the application configuration file A 112 (step S10 in FIG. 4) and the checksum calculation (step S11 in FIG. 4) in parallel.

When the checksum calculation ends, the CPU 4 refers to the replacement flag and boot history value for the application configuration file A 112 and, if the replacement flag and boot history value are both '1', proceeds to step S36 in FIG. 7. If the replacement flag is '0', it proceeds to step S12 in FIG. 4; if the replacement flag is '1' and the boot history value is '2', it proceeds to step S43 described later.

In step S36, the CPU 4 determines whether the application configuration file A 112 has any faults. Specifically, if the application configuration file A 112 boots normally and the calculated checksum value agrees with the checksum value 113, the CPU 4 determines that there is no fault; if the application configuration file A 112 does not boot normally, or if the two checksum values do not agree, it determines that there is a fault.

If it is determined that there is no fault (NO in step S36), the CPU 4 changes the boot history value for the application configuration file A 112 to '0' (S37) and replaces the second application configuration file A backup 120 with the first application configuration file A backup 116 (S38). Then, the CPU 4 returns the replacement flag for the application configuration file A 112 to '0' (S39) and ends the file replacement process. After the file replacement process ends, the CPU 4 enters a waiting state.

On the other hand, if it is determined that there is a fault (YES in step S36), the CPU 4 replaces the application configuration file A 112 with the second application configuration file A backup 120 (S40), changes the boot history value for the application configuration file A 112 to '2' (S41), and reboots the application (S42). Specifically, the CPU 4 reads again the application configuration file A 112 in the state where the system (specifically, the kernel) has been booted, and performs the boot process of the application configuration file A 112 (step S10 in FIG. 4) and the checksum calculation (step S11 in FIG. 4) in parallel.

When the checksum calculation ends, the CPU 4 refers to the replacement flag and boot history value for the application configuration file A 112 and, if the replacement flag is '1' and the boot history value is '2', it proceeds to step S43 in FIG. 7.

In step S43, the CPU 4 determines whether the application configuration file A 112 has any faults in the same way as in step S36.

If it is determined that there is no fault (NO in step S43), the CPU 4 informs a user that the new application configuration file obtained from the external source is faulty (S44), and ends the file replacement process. After the file replacement process ends, the CPU 4 enters a waiting state.

On the other hand, if it is determined that there is a fault (YES in step S43), the CPU 4 returns to step S26 in FIG. 5, outputs again the message informing that a new application configuration file must be obtained from an external source, and executes the file replacement process (S27).

The file replacement process for the application configuration file B 114 is the same as that for the application configuration file A 112.

<Backup Check Process>

Figure 9:
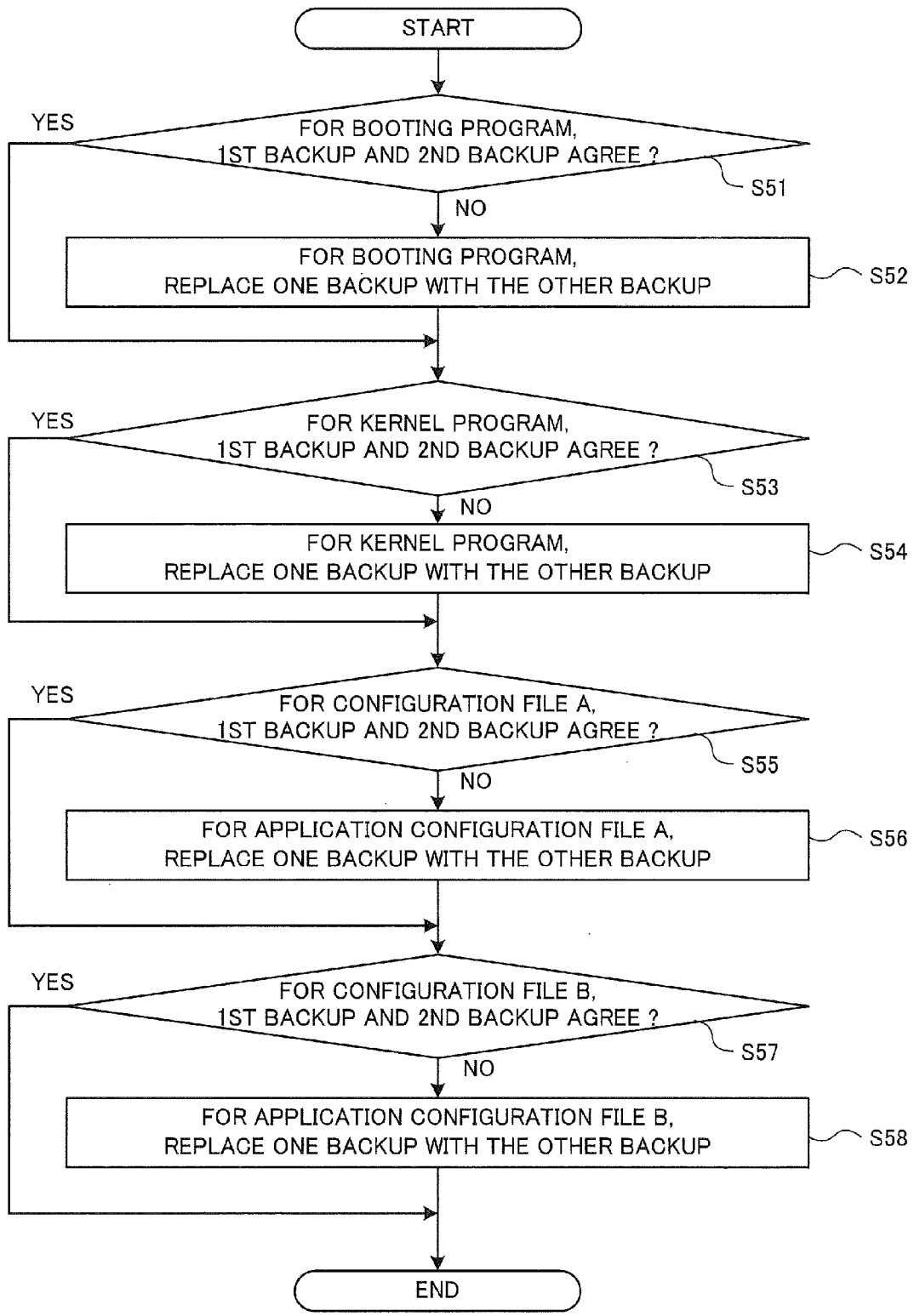
FIG. 9 is a flowchart showing a backup check process.

The information processing device 1 may perform a backup check process to check whether the backup programs and backup files have any errors (the correctness of the backup programs and backup files) during periods in which error detection processes are in the waiting state in the processing in FIG. 4. The periods include, specifically, the waiting period from the determination of YES in step S3 in FIG. 4 to the start of step S6, the waiting period from the determination of YES in step S7 to the start of step S11, and the waiting period from the determination of YES in step S12 to the end of step S10. FIG. 9 is a flowchart showing the backup check process. The backup check process will be described below with reference to FIG. 9.

The CPU 4 compares the first booting program backup 102 with the second booting program backup 104 to determine whether the two agree with each other (S51). If the two do not agree (NO in step S51), it proceeds to step S52; if the two agree (YES in step S51), it proceeds to step S53.

In step S52, the CPU 4 calculates the checksum value of each of the first booting program backup 102 and second booting program backup 104, and determines whether the calculated checksum value of the first, booting program backup 102 agrees with the checksum value 103 and whether the calculated checksum value of the second booting program backup 104 agrees with the checksum value 105. If the checksum value of one of the first booting program backup 102 and second booting program backup 104 agrees but the checksum value of the other one does not agree, the CPU 4 replaces the other backup program with the one backup program having the matching checksum value and proceeds to step S53. If both the checksum values of the first booting program backup 102 and second booting program backup 104 do not agree, the first booting program backup 102 and second booting program backup 104 may be replaced with the booting program 100 or a new booting program obtained from an external source, for example.

In step S53, the CPU 4 compares the first kernel program backup 108 with the second kernel program backup 110 to determine whether the two agree with each other. If the two do not agree (NO in step S53), it proceeds to step S54; if the two agree (YES in step S53), it proceeds to step S55.

In step S54, the CPU 4 calculates the checksum value of each of the first kernel program backup 108 and second kernel program backup 110, and determines whether the calculated checksum value of the first kernel program backup 108 agrees with the checksum value 109 and whether the calculated checksum value of the second kernel program backup 110 agrees with the checksum value 111. If the checksum value of one of the first kernel program backup 108 and second kernel program backup 110 agrees but the checksum value of the other one does not agree, the CPU 4 replaces the other backup program with the one backup program having the matching checksum value and proceeds to step S55. If both the checksum values of the first kernel program backup 108 and second kernel program backup 110 do not agree, the first kernel program backup 108 and second kernel program backup 110 may be replaced with the kernel program 106 or a new kernel program obtained from an external source, for example.

In step S55, the CPU 4 compares the first application configuration file A backup 116 with the second application configuration file A backup 120 to determine whether the two agree with each other. If the two do not agree (NO in step S55), it proceeds to step S56; if the two agree (YES in step S55), it proceeds to step S57.

In step S56, the CPU 4 calculates the checksum value of each of the first application configuration file A backup 116 and second application configuration file A backup 120, and determines whether the calculated checksum value of the first application configuration file A backup 116 agrees with the checksum value 117 and whether the calculated checksum value of the second application configuration file A backup 120 agrees with the checksum value 121. If the checksum value of one of the first application configuration file A backup 116 and second application configuration file A backup 120 agrees but the checksum value of the other one does not agree, the CPU 4 replaces the other backup file with the one backup file having the matching checksum value and proceeds to step S57. If both the checksum values of the first application configuration file A backup 116 and second application configuration file A backup 120 do not agree, the first application configuration file A backup 116 and second application configuration file A backup 120 may be replaced with the application configuration file A 112 or a new application configuration file obtained from an external source, for example.

In step S57, the CPU 4 compares the first application configuration file B backup 118 with the second application configuration file B backup 122 to determine whether the two agree with each other. If the two do not agree (NO in step S57), it proceeds to step S58; if the two agree (YES in step S57), it ends the backup check process to enter a waiting state.

In step S58, the CPU 4 performs the same process as in step S56 on the first application configuration file B backup 118 and second application configuration file B backup 122, and then ends the backup check process to enter the waiting state.

<Advantages>

The following advantages (1) to (16) can be obtained from this embodiment described above.

(1) The information processing device in this embodiment is configured to execute a boot program to perform a boot process of a system, and perform error detection on the boot program in parallel with the boot process. According to this embodiment, the boot process of the system can be started more quickly in comparison with a configuration that starts the boot process of the system after performing the error detection on the boot program. This makes it possible to display the startup screen of the system more quickly, for example. Moreover, the information processing device in this embodiment reboots the system using a backup program when an error is detected in the boot program. Thus, when the boot program has an error, the system can be booted with a more reliable boot program.

In particular, recently, as devices have become increasingly sophisticated, the amount of data of the boot program has been increasing greatly, increasing the processing time of the error detection process on the boot program. The configuration that starts the boot process of the system after performing error detection on the boot program has a problem that the start of the system boot process is greatly delayed. The present embodiment can solve this problem.

Figure 10:
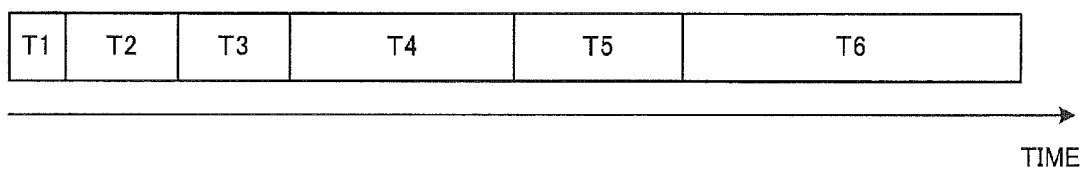
FIG. 10 is a schematic diagram showing processing periods in a configuration that performs boot processes after error detection.

FIG. 10 is a graph showing processing periods in a configuration that performs boot processes after error detection. FIG. 10 has a horizontal axis representing time, and shows a processing period T1 of the error detection process of a booting program, a processing period T2 of the boot process of the booting program, a processing period T3 of the error detection process of a kernel program, a processing period T4 of the boot process of the kernel program, a processing period T5 of the error detection processes of application configuration files, and a processing period T6 of the boot processes of the application configuration files.

Figure 11:
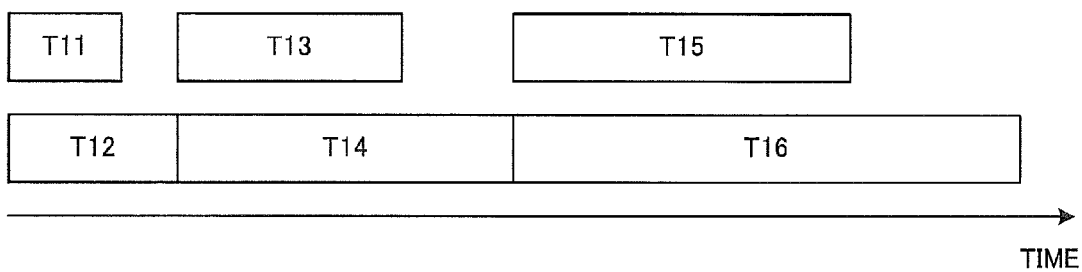
FIG. 11 is a schematic diagram showing processing periods in the configuration of the embodiment.

FIG. 11 is a graph showing processing periods in the configuration of this embodiment. FIG. 11 has a horizontal axis representing time, and shows a processing period T11 of the error detection process of the booting program, a processing period T12 of the boot process of the booting program, a processing period T13 of the error detection process of the kernel program, a processing period T14 of the boot process of the kernel program, a processing period T15 of the error detection processes of an application configuration files, and a processing period T16 of the boot processes of the application configuration files.

From FIGS. 10 and 11, it can be seen that the start timings of the boot processes of the booting program, kernel program, and application configuration files in this embodiment are earlier than those in the configuration that performs the boot processes after error detection.

(2) When an error is detected in the boot program, the information processing device performs a recovery process to replace the boot program stored in the program area with a backup program stored in the backup areas, and reboots the system using the replaced program. According to this aspect, by replacing the erroneous boot program with the backup program, it is possible to increase the number of correct boot programs and improve the reliability of the system booting.

(3) When performing the recovery process, the information processing device refers to history information indicating the history of replacement of the boot program with the backup programs and selects the backup program used for the replacement. This makes it possible to perform the reboot with a highly reliable program when an error is detected in the boot program. Specifically, it is possible to select a backup program that does not meet the condition that it was used for the replacement of the program and an error was detected in the replaced program (or to select a backup program in which an error has not been detected), so that the reboot process can be performed with a more reliable backup program.

(4) In the recovery process, the information processing device refers to replacement order information indicating the order of the backup programs for the replacement, and selects the backup program used for the replacement based on the replacement order information and history information. According to this aspect, the replacement order can be changed by changing the replacement order information. This makes it possible, for example, to delay the use of a backup program recorded in a dead block or a block with a high error detection rate in the nonvolatile memory, and preferentially use a more reliable backup program for the replacement. The dead block means a block in which normal read or write operations are impossible, such as a block in which the number of times of rewriting has exceeded a predetermined rewriting limit value or an initial defective block in a semiconductor device.

(5) In the recovery process, the information processing device selects a backup program that has not been used for the replacement as the backup program used for the replacement. According to this aspect, the reboot process can be performed with a highly reliable backup program.

(6) In the program replacement process to replace the boot program with a new boot program, the information processing device obtains a new boot program, replaces a predetermined backup program of the backup programs stored in the backup areas with the new boot program, replaces the boot program stored in the program area with the predetermined backup program, and when the replaced boot program is executed, if there is no fault, replaces one or more of the backup programs other than the predetermined backup program with the replaced predetermined backup program or the replaced boot program, and if there is a fault, replaces the boot program stored in the program area with a backup program other than the predetermined backup program. According to this aspect, when the boot program is replaced with the new boot program, if the replaced new boot program has a fault (for example, if the normal booting is impossible, or if an improper bit change has been detected), it is possible to restore the boot program in the program area to its former state before the replacement while keeping the backup of the new boot program. Thus, for example, when the new boot program has an error and cannot boot the system, it is possible to prevent a situation in which the boot program cannot be restored to the former boot program and the system cannot be booted.

(7) The information processing device executes an application configuration file to perform a boot process of an application, and performs error detection on the application configuration file in parallel with the boot process. According to this aspect, the boot process of the application can be started more quickly in comparison with a configuration that starts the boot process of the application after performing the error detection on the application configuration file. This makes it possible to display the startup screen of the application more quickly, for example. Moreover, when an error is detected in the application configuration file, the information processing device reboots the application using a backup file. Thus, when the application configuration file has an error, the application can be booted with a more reliable application configuration file.

(8) When an error is detected in the application configuration file, the information processing device performs a recovery process to replace the application configuration file stored in the file area with a backup file stored in the backup file areas, and reboots the application with the replaced application configuration file. According to this aspect, by replacing the erroneous application configuration file with the backup file, it is possible to increase the number of correct application configuration files and improve the reliability of the application booting.

(9) In the recovery process, the information processing device refers to history information indicating the history of replacement of the application configuration file with the backup files and selects the backup file used for the replacement. This makes it possible to perform the reboot with a highly reliable file when an error is detected in the application configuration file. Specifically, it is possible to select a backup file that does not meet the condition that it was used for the replacement of the application configuration file and an error was detected in the replaced application configuration file (or to select a backup file in which an error has not been detected), so that the reboot process can be performed with a more reliable backup file.

(10) In the recovery process, the information processing device refers to replacement order information indicating the order of the backup files for the replacement, and selects the backup file used for the replacement based on the replacement order information and history information. According to this aspect, the replacement order can be changed by changing the replacement order information. This makes it possible, for example, to delay the use of a backup file recorded in a dead block or a block with a high error detection rate in the nonvolatile memory, and preferentially use a more reliable backup file for the replacement.

(11) In the recovery process, the information processing device selects a backup file that has not been used for the replacement as the backup file used for the replacement. According to this aspect, the reboot process can be performed with a highly reliable backup file.

(12) In the file replacement process to replace the application configuration file with a new application configuration file, the information processing device obtains a new application configuration file, replaces a predetermined backup file of the backup files stored in the backup file areas with the new application configuration file, replaces the application configuration file stored in the file area with the predetermined backup file, and when the replaced application configuration file is executed, if there is no fault, replaces one or more of the backup files other than the predetermined backup file with the replaced predetermined backup file or the replaced application configuration file, and if there is a fault, replaces the application configuration file stored in the file area with a backup file other than the predetermined backup file. According to this aspect, when the application configuration file is replaced with the new application configuration file, if the replaced new application configuration file has a fault (for example, if the normal booting is impossible, or if an improper bit change has been detected), it is possible to restore the application configuration file in the file area to its former state before the replacement while keeping the backup of the new application configuration file. Thus, for example, when the new application configuration file has an error and cannot boot the application, it is possible to prevent a situation in which the application configuration file cannot be restored to the former application configuration file and the application cannot be booted.

(13) The file area in the nonvolatile memory stores a plurality of application configuration files in such a manner that the plurality of application configuration files can be read in units of application configuration file. According to this aspect, data can be transferred from the nonvolatile memory to the work memory for each application configuration file, and therefore the transfer time to the work memory can be reduced.

(14) The file area in the nonvolatile memory stores the plurality of application configuration files and the error detection data for each of the plurality of application configuration files. In this aspect, since the error detection data (e.g., the checksum value) are appended individually to each of the application configuration files, the processing time for the error detection using the error detection data (for example, the checksum value calculation time) can be reduced in comparison with a case in which error detection data (e.g. a checksum value) are appended to a file group including the plurality of application configuration files.

(15) The information processing device performs error detection on the backup programs stored in the backup areas, and replaces a backup program in which an error has been detected with a backup program in which no error has been detected. According to this aspect, the reliability of the backup programs can be improved. This makes it possible, for example, to suppress the possibility that the replacement of the boot program with a backup program is determined to be impossible in step S23 in the reboot process (S4 or S8) in FIG. 4.

(16) The information processing device performs error detection on the backup files stored in the backup file areas, and replaces a backup file in which an error has been detected with a backup file in which no error has been detected. According to this aspect, the reliability of the backup files can be improved. This makes it possible, for example, to suppress the possibility that the replacement of the application configuration file with a backup file is determined to be impossible in step S23 in the reboot process (S13) in FIG. 4.

The present invention is not limited to the embodiment described above; it can be practiced in various other aspects without departing from the inventive scope.

For example, the above description illustrates a configuration that, when an error is detected in a boot program, performs replacement of the boot program with a backup program (the recovery process) and then reboots the system, but the information processing device 1 may read the backup program into the work memory 3 to reboot the system without performing the replacement of the boot program (the recovery process). Similarly, the information processing device 1 may read the backup file into the work memory 3 to reboot the application without performing the replacement of the application configuration file with the backup file (the recovery process). Regarding the boot program (specifically, the booting program 100) that is read and executed first out of the boot programs, the recovery process is necessary when the boot address is fixed. However, in a configuration in which the boot address can be changed, by changing the boot address to the starting address of the backup program, it is possible to perform the reboot without the recovery process.

The above description illustrates a configuration in which the nonvolatile memory 2 stores a plurality of backup programs, but the number of backup programs is not limited to plural and may be one. The same applies to the backup files.

The above description illustrates a case where the two files of the application configuration file A 112 and application configuration file B 114 are used as the application configuration file, but the number of application configuration files may be one or more. In practice, more application configuration files are often needed.

The above description illustrates a configuration in which the process executing unit 11 and error detection unit 12 are implemented by the same CPU 4 and the same programs, but the error detection unit 12 may also be implemented in the following forms (a) to (d).

(a) The error detection unit 12 is implemented by execution, by the CPU 4, of error detection programs different from the boot programs.

(b) The error detection unit 12 is implemented by execution, by a CPU different from the CPU 4, of error detection processes described either in the boot programs or in error detection programs different from the boot programs.

(c) The CPU 4 includes a plurality of processor cores, the process executing unit 11 is implemented by one or more of the processor cores, and the error detection unit 12 is implemented by execution, by other one or more of the processor cores, of error detection processes described either in the boot programs or in error detection programs different from the boot programs.

(d) The error detection unit 12 is implemented by a hardware circuit for error detection.

In a configuration that executes the boot processes and error detection processes in parallel by different processing devices as in (b) to (d) above, the boot processes and error detection processes can be executed truly in parallel, and the boot time can be reduced in comparison with the configuration that starts the boot process of the system after error detection on the boot program.

Figure 12:
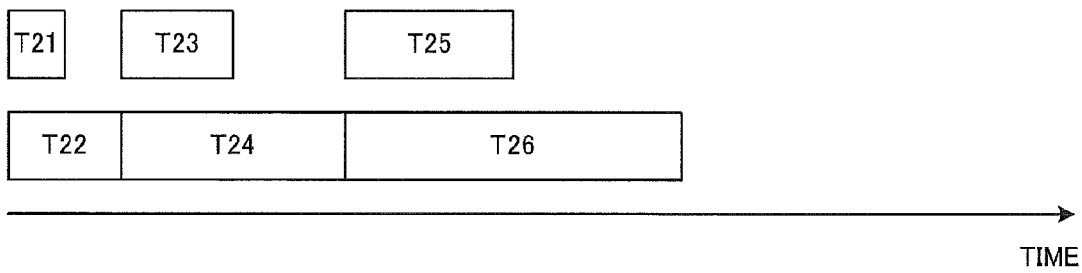
FIG. 12 is a schematic diagram showing processing periods in a configuration that performs boot processes and error detection processes in parallel by different processing devices.

FIG. 12 is a graph showing processing periods in a configuration that executes the boot processes and the error detection processes in parallel by different processing devices. FIG. 12 has a horizontal axis representing time, and shows a processing period T21 of the error detection process of the booting program, a processing period T22 of the boot process of the booting program, a processing period T23 of the error detection process of the kernel program, a processing period T24 of the boot process of the kernel program, a processing period T25 of the error detection processes of the application configuration files, and a processing period T26 of the boot processes of the application configuration files.

From FIGS. 10 and 12, it can be seen that, in the configuration that executes the boot processes and the error detection processes in parallel by different processing devices, the end timings of the respective boot processes of the booting program, kernel program, and application configuration files are earlier than those in the configuration that performs the boot processes after the error detection.

Like the error detection unit 12, the reboot unit 13 and replacement control unit 14 may also be implemented in the forms (a) to (d) described above.

The above description illustrates, as the history information indicating the history of replacement of the programs with the backup programs, the boot history values indicating the replacement sources of the programs. However, the history information is not limited to this, and may be information indicating backup programs used for replacement of the program in the past, for example. The history information may be prepared for each backup program. For example, for each of the backup programs, a history flag indicating whether the backup program has been used for the replacement of the program in the past may be recorded in the nonvolatile memory 2. The history flag is '0' when the backup program has not been used for the replacement, and is '1' when the backup program has been used for the replacement, for example. The same applies to the application configuration files.

The above description illustrates a configuration that selects a backup program that has not been used for the replacement based on the history information, but another backup program may be selected. For example, in a nonvolatile memory, if a reading operation has not been performed on a block for a long period of time, data contents in the block may be improperly changed due to leakage of charge over time. The risk of occurrence of the charge leakage can be suppressed by reading the backup programs as evenly as possible in the recovery processes. From this point of view, the reboot unit 13 may be configured to select a backup program that has not been read for a long period of time with reference to the history information. This configuration can prevent charge leakage in the nonvolatile memory. The backup program that has not been read for a long period of time includes, for example, the backup program that has not been read for the longest period of time out of the backup programs, and a backup program that has not been read for a predetermined period of time. In this configuration, for example, the history information indicates, for each of the backup programs, a period of time for which the backup program has not been read.

REFERENCE CHARACTERS

1 information processing device, 2 nonvolatile memory, 3 work memory, 4 CPU, 5 communication unit, 6 external interface, 10 parallel processing unit, 11 process executing unit, 12 error detection unit, 13 reboot unit, 14 replacement control unit, 100 booting program, 101, 103, 105, 107, 109, 111, 113, 115, 117, 119, 121, 123 checksum value, 102 first booting program backup, 104 second booting program backup, 106 kernel program, 108 first kernel program backup, 110 second kernel program backup, 112 application configuration file A, 114 application configuration file B, 116 first application configuration file A backup, 118 first application configuration file B backup, 120 second application configuration file A backup, 122 second application configuration file B backup, 124 replacement flag information, 126 boot history information, 128 replacement order information.

What is claimed is:

1. An information processing device comprising:
    a nonvolatile memory having a program area storing a program for booting a system, and a plurality of backup areas each storing a backup program identical in content to the program;
    a process executing unit that executes the program stored in the program area to perform a boot process of the system;
    an error detection unit that performs error detection on the program stored in the program area in parallel with the boot process by the process executing unit; and
    a reboot unit that, when the error detection unit detects an error in the program, performs a recovery process to replace the program stored in the program area with one of the backup programs stored in the backup areas, and reboots the system using the replaced program stored in the program area; wherein
    when performing the recovery process, the reboot unit refers to history information indicating a history of replacement of the program with the backup programs, selects the backup program used for the replacement from among the backup programs based on the history information, and replaces the program with the selected backup program.

2. The information processing device of claim 1, wherein in the recovery process, the reboot unit further refers to replacement order information indicating an order of the backup programs for the replacement, selects the backup program used for the replacement from among the backup programs based on the replacement order information and the history information, and replaces the program with the selected backup program.

3. The information processing device of claim 2, further comprising a replacement unit that performs a program replacement process to replace the program with a new program that has not been stored in the backup areas, wherein
    in the program replacement process, the replacement unit obtains the new program, replaces a predetermined backup program of the backup programs stored in the backup program areas with the new program, replaces the program stored in the program area with the predetermined backup program, and when the replaced program is executed, if there is no fault, replaces one or more of the backup programs other than the predetermined backup program with the replaced predetermined backup program or the replaced program, and if there is a fault, replaces the program stored in the program area with one of the backup programs other than the predetermined backup program.

4. The information processing device of claim 3, wherein:
    the nonvolatile memory further has a file area storing an application configuration file for booting an application, and one or more backup file areas each storing a backup file identical in content to the application configuration file;
    the process executing unit executes the application configuration file stored in the file area to perform a boot process of the application;
    the error detection unit performs error detection on the application configuration file stored in the file area in parallel with the boot process of the application by the process executing unit; and
    when the error detection unit detects an error in the application configuration file, the reboot unit reboots the application using one of the one or more backup files stored in the one or more backup file areas.

5. The information processing device of claim 2, wherein:
    the nonvolatile memory further has a file area storing an application configuration file for booting an application, and one or more backup file areas each storing a backup file identical in content to the application configuration file;
    the process executing unit executes the application configuration file stored in the file area to perform a boot process of the application;
    the error detection unit performs error detection on the application configuration file stored in the file area in parallel with the boot process of the application by the process executing unit; and
    when the error detection unit detects an error in the application configuration file, the reboot unit reboots the application using one of the one or more backup files stored in the one or more backup file areas.

6. The information processing device of claim 1, further comprising a replacement unit that performs a program replacement process to replace the program with a new program that has not been stored in the backup areas, wherein
    in the program replacement process, the replacement unit obtains the new program, replaces a predetermined backup program of the backup programs stored in the backup program areas with the new program, replaces the program stored in the program area with the predetermined backup program, and when the replaced program is executed, if there is no fault, replaces one or more of the backup programs other than the predetermined backup program with the replaced predetermined backup program or the replaced program, and if there is a fault, replaces the program stored in the program area with one of the backup programs other than the predetermined backup program.

7. The information processing device of claim 6, wherein:
the nonvolatile memory further has a file area storing an application configuration file for booting an application, and one or more backup file areas each storing a backup file identical in content to the application configuration file;
the process executing unit executes the application configuration file stored in the file area to perform a boot process of the application;
the error detection unit performs error detection on the application configuration file stored in the file area in parallel with the boot process of the application by the process executing unit; and
when the error detection unit detects an error in the application configuration file, the reboot unit reboots the application using one of the one or more backup files stored in the one or more backup file areas.

8. The information processing device of claim 1, wherein:
the nonvolatile memory further has a file area storing an application configuration file for booting an application, and one or more backup file areas each storing a backup file identical in content to the application configuration file;
the process executing unit executes the application configuration file stored in the file area to perform a boot process of the application;
the error detection unit performs error detection on the application configuration file stored in the file area in parallel with the boot process of the application by the process executing unit; and
when the error detection unit detects an error in the application configuration file, the reboot unit reboots the application using one of the one or more backup files stored in the one or more backup file areas.

9. An information processing method comprising:
executing a program for booting a system stored in a nonvolatile memory to perform a boot process of the system, the nonvolatile memory having a program area storing the program and a plurality of backup areas each storing a backup program identical in content to the program;
performing error detection on the program stored in the program area in parallel with the boot process; and
when an error is detected in the program, performing a recovery process to replace the program stored in the program area with one of the backup programs stored in the backup areas, and rebooting the system using the replaced program stored in the program area; wherein
the recovery process includes referring to history information indicating a history of replacement of the program with the backup programs, selecting the backup program used for the replacement from among the backup programs based on the history information, and replacing the program with the selected backup program.

10. The information processing method of claim 9, wherein the recovery process further includes referring to replacement order information indicating an order of the backup programs for the replacement, and the backup program used for the replacement is selected from among the backup programs based on the replacement order information and the history information.

11. The information processing method of claim 10, further comprising performing a program replacement process to replace the program with a new program that has not been stored in the backup areas, wherein
the program replacement process includes obtaining the new program, replacing a predetermined backup program of the backup programs stored in the backup program areas with the new program, replacing the program stored in the program area with the predetermined backup program, and when the replaced program is executed, if there is no fault, replacing one or more of the backup programs other than the predetermined backup program with the replaced predetermined backup program or the replaced program, and if there is a fault, replacing the program stored in the program area with one of the backup programs other than the predetermined backup program.

12. The information processing method of claim 11, wherein:
the nonvolatile memory further has a file area storing an application configuration file for booting an application, and one or more backup file areas each storing a backup file identical in content to the application configuration file; and
the information processing method further comprises:
executing the application configuration file stored in the file area to perform a boot process of the application;
performing error detection on the application configuration file stored in the file area in parallel with the boot process of the application; and
when an error is detected in the application configuration file, rebooting the application using one of the one or more backup files stored in the one or more backup file areas.

13. The information processing method of claim 10, wherein:
the nonvolatile memory further has a file area storing an application configuration file for booting an application, and one or more backup file areas each storing a backup file identical in content to the application configuration file; and
the information processing method further comprises:
executing the application configuration file stored in the file area to perform a boot process of the application;
performing error detection on the application configuration file stored in the file area in parallel with the boot process of the application; and
when an error is detected in the application configuration file, rebooting the application using one of the one or more backup files stored in the one or more backup file areas.

14. The information processing method of claim 9, further comprising performing a program replacement process to replace the program with a new program that has not been stored in the backup areas, wherein
the program replacement process includes obtaining the new program, replacing a predetermined backup program of the backup programs stored in the backup program areas with the new program, replacing the program stored in the program area with the predetermined backup program, and when the replaced program is executed, if there is no fault, replacing one or more of the backup programs other than the predetermined backup program with the replaced predetermined backup program or the replaced program, and if there is a fault, replacing the program stored in the program area with one of the backup programs other than the predetermined backup program.

15. The information processing method of claim 14, wherein:
the nonvolatile memory further has a file area storing an application configuration file for booting an application, and one or more backup file areas each storing a backup file identical in content to the application configuration file; and
the information processing method further comprises:
executing the application configuration file stored in the file area to perform a boot process of the application;
performing error detection on the application configuration file stored in the file area in parallel with the boot process of the application; and
when an error is detected in the application configuration file, rebooting the application using one of the one or more backup files stored in the one or more backup file areas.

16. The information processing method of claim 9, wherein:
the nonvolatile memory further has a file area storing an application configuration file for booting an application, and one or more backup file areas each storing a backup file identical in content to the application configuration file; and
the information processing method further comprises:
executing the application configuration file stored in the file area to perform a boot process of the application;
performing error detection on the application configuration file stored in the file area in parallel with the boot process of the application; and
when an error is detected in the application configuration file, rebooting the application using one of the one or more backup files stored in the one or more backup file areas.

17. A non-transitory computer-readable storage medium storing a computer program causing a computer to execute:
executing a program for booting a system stored in a nonvolatile memory to perform a boot process of the system, the nonvolatile memory having a program area storing the program and a plurality of backup areas each storing a backup program identical in content to the program;
performing error detection on the program stored in the program area in parallel with the boot process; and
when an error is detected in the program, performing a recovery process to replace the program stored in the program area with one of the backup programs stored in the backup areas, and rebooting the system using the replaced program stored in the program area; wherein
the recovery process includes referring to history information indicating a history of replacement of the program with the backup programs, selecting the backup program used for the replacement from among the backup programs based on the history information, and replacing the program with the selected backup program.

* * * * *